United States Patent
Hughes et al.

(10) Patent No.: US 9,717,021 B2
(45) Date of Patent: Jul. 25, 2017

(54) VIRTUAL NETWORK OVERLAY

(71) Applicant: Silver Peak Systems, Inc., Santa Clara, CA (US)

(72) Inventors: David Anthony Hughes, Los Altos Hills, CA (US); Santosh Bheemarajaiah, Sunnyvale, CA (US); Damon John Ennis, San Jose, CA (US); David Holt Merwin, Redwood City, CA (US); Rolf Muralt, Palo Alto, CA (US); Pawan Kumar Singh, Los Altos, CA (US); Theodore E. Tedijanto, Cupertino, CA (US); Lokesh Lingarajan, Santa Clara, CA (US); Edward P. Travalia, Battle Ground, WA (US); Krishna Kumar Sadasivam, San Jose, CA (US); Shyh Pei Yen, San Jose, CA (US); Abhelaksh Thakur, Fremont, CA (US); Catrina A. Torda, San Jose, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 0 days.

(21) Appl. No.: 15/091,533

(22) Filed: Apr. 5, 2016

(65) Prior Publication Data
US 2016/0218947 A1      Jul. 28, 2016

Related U.S. Application Data

(63) Continuation-in-part of application No. 14/981,814, filed on Dec. 28, 2015, and a continuation-in-part of
(Continued)

(51) Int. Cl.
*H04W 28/18* (2009.01)
*H04L 12/26* (2006.01)
(Continued)

(52) U.S. Cl.
CPC ............ *H04W 28/18* (2013.01); *H04J 11/00* (2013.01); *H04L 12/2801* (2013.01);
(Continued)

(58) Field of Classification Search
CPC ... H04L 43/0823; H04L 47/24; H04L 43/087; H04L 43/0829; H04L 43/0847; H04L 43/0852; H04L 47/2441
See application file for complete search history.

(56) References Cited

U.S. PATENT DOCUMENTS

| 4,494,108 A | 1/1985 | Langdon, Jr. et al. |
| 4,558,302 A | 12/1985 | Welch |

(Continued)

FOREIGN PATENT DOCUMENTS

| EP | 1507353 | 2/2005 |
| JP | H05061964 | 3/1993 |
| WO | WO0135226 A1 | 5/2001 |

OTHER PUBLICATIONS

US 5,434,641, 08/2002, Haupt et al. (withdrawn)
(Continued)

*Primary Examiner* — Feben M Haile
(74) *Attorney, Agent, or Firm* — Carr & Ferrell LLP

(57) ABSTRACT

Disclosed herein are systems and methods for the creation, maintenance and management of virtual overlay networks across multiple communication networks managed by service providers. The simple creation and management of network overlays is accomplished via a network orchestrator manager, allowing for automation of configuration of connected network devices throughout an entire organization's network, regardless of the physical location of each device.

13 Claims, 21 Drawing Sheets

Related U.S. Application Data application No. 14/677,841, filed on Apr. 2, 2015, now Pat. No. 9,397,951, which is a continuation of application No. 14/248,188, filed on Apr. 8, 2014, now Pat. No. 9,143,455, which is a continuation of application No. 12/217,440, filed on Jul. 3, 2008, now Pat. No. 8,743,683.

(51) Int. Cl.

| | | |
|---|---|---|
| *H04J 11/00* | (2006.01) | |
| *H04L 12/28* | (2006.01) | |
| *H04L 12/715* | (2013.01) | |
| *H04L 12/851* | (2013.01) | |
| *H04L 12/723* | (2013.01) | |

(52) U.S. Cl.
CPC ...... *H04L 12/2854* (2013.01); *H04L 43/0823* (2013.01); *H04L 45/64* (2013.01); *H04L 47/2441* (2013.01); *H04L 43/087* (2013.01); *H04L 43/0829* (2013.01); *H04L 43/0847* (2013.01); *H04L 43/0852* (2013.01); *H04L 45/50* (2013.01)

(56) References Cited

U.S. PATENT DOCUMENTS

| | | |
|---|---|---|
| 4,612,532 A | 9/1986 | Bacon et al. |
| 5,023,611 A | 6/1991 | Chamzas et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Williams et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel, III et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,769,048 B2 | 7/2004 | Goldberg et al. |
| 6,791,945 B1 | 9/2004 | Levenson et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,197,597 B1 | 3/2007 | Scheid et al. |
| 7,200,847 B2 | 4/2007 | Straube et al. |
| 7,215,667 B1 | 5/2007 | Davis |
| 7,242,681 B1 | 7/2007 | Van Bokkelen et al. |
| 7,243,094 B2 | 7/2007 | Tabellion et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie, III et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,619,545 B2 | 11/2009 | Samuels et al. |
| 7,620,870 B2 | 11/2009 | Srinivasan et al. |
| 7,624,446 B1 | 11/2009 | Wilhelm |
| 7,630,295 B2 | 12/2009 | Hughes et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,810,155 B1 | 10/2010 | Ravi |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,925,711 B1 | 4/2011 | Gopalan et al. |
| 7,941,606 B1 | 5/2011 | Pullela et al. |

(56) References Cited

U.S. PATENT DOCUMENTS

| | | |
|---|---|---|
| 7,945,736 B2 | 5/2011 | Hughes et al. |
| 7,948,921 B1 | 5/2011 | Hughes et al. |
| 7,953,869 B2 | 5/2011 | Demmer et al. |
| 7,970,898 B2 | 6/2011 | Clubb et al. |
| 7,975,018 B2 | 7/2011 | Unrau et al. |
| 8,069,225 B2 | 11/2011 | McCanne et al. |
| 8,072,985 B2 | 12/2011 | Golan et al. |
| 8,090,027 B2 | 1/2012 | Schneider |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,565,118 B2 | 10/2013 | Shukla et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 * | 4/2014 | Zheng ............... H04L 12/2856 370/352 |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,811,431 B2 | 8/2014 | Hughes |
| 8,885,632 B2 | 11/2014 | Hughes et al. |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,130,991 B2 | 9/2015 | Hughes |
| 9,143,455 B1 | 9/2015 | Hughes |
| 9,152,574 B2 | 10/2015 | Hughes et al. |
| 9,191,342 B2 | 11/2015 | Hughes et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,309 B2 | 6/2016 | Hughes |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 * | 2/2017 | Sung ..................... H04L 1/189 |
| 9,613,071 B1 | 4/2017 | Hughes |
| 9,626,224 B2 | 4/2017 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0010702 A1 | 1/2002 | Ajtai et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0046572 A1 | 3/2003 | Newman et al. |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0195547 A1 | 8/2006 | Sundarrajan et al. |

(56) References Cited

U.S. PATENT DOCUMENTS

| | | |
|---|---|---|
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0174428 A1 | 7/2007 | Lev Ran et al. |
| 2007/0179900 A1 | 8/2007 | Daase et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0204961 A1 | 8/2009 | DeHaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | van der Linden et al. |
| 2011/0113472 A1 | 5/2011 | Fung et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0173759 A1 | 7/2012 | Agarwal et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0086236 A1 | 4/2013 | Baucke et al. |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0163594 A1* | 6/2013 | Sharma ............... H04L 45/64 |
| | | 370/392 |
| 2013/0250951 A1 | 9/2013 | Koganti |
| 2013/0263125 A1 | 10/2013 | Shamsee et al. |
| 2013/0282970 A1 | 10/2013 | Hughes et al. |
| 2013/0343191 A1 | 12/2013 | Kim et al. |
| 2014/0052864 A1 | 2/2014 | Van Der Linden et al. |
| 2014/0075554 A1 | 3/2014 | Cooley |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1* | 9/2014 | DeCusatis ............. H04L 45/52 |
| | | 370/390 |
| 2014/0279078 A1 | 9/2014 | Nukala et al. |
| 2014/0379937 A1 | 12/2014 | Hughes et al. |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0120663 A1 | 4/2015 | Le Scouarnec et al. |
| 2015/0170221 A1 | 6/2015 | Shah |
| 2015/0281099 A1* | 10/2015 | Banavalikar ........ H04L 12/4633 |
| | | 370/230 |
| 2015/0281391 A1 | 10/2015 | Hughes et al. |
| 2015/0334210 A1 | 11/2015 | Hughes |
| 2016/0014051 A1 | 1/2016 | Hughes et al. |
| 2016/0034305 A1 | 2/2016 | Shear et al. |

(56) References Cited

U.S. PATENT DOCUMENTS

| | | |
|---|---|---|
| 2016/0093193 A1 | 3/2016 | Silvers et al. |
| 2016/0255542 A1 | 9/2016 | Hughes et al. |
| 2017/0111692 A1 | 4/2017 | An et al. |

OTHER PUBLICATIONS

Singh et al.; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, <http://www.lancache.com/slcdata.htm>.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.

Manber, Udi, "Finding Similar Files in a Large File System", TR 93-33 Oct. 1994, Department of Computer Science, University of Arizona. <http://webglimpse.netipubs/TR93-33.pdf>. Also appears in the 1994 winter USENIX Technical Conference.

Knutsson, Bjorn et al., "Transparent Proxy Signalling", Journal of Communications and Networks, vol. 3, No. 2, Jun. 2001.

Newton, "Newton's Telecom Dictionary", 17th Ed., 2001, pp. 38, 201, and 714.

Silver Peak Systems, "The Benefits of Byte-level WAN Deduplication" (2008).

Business Wire, "Silver Peak Systems Delivers Family of Appliances for Enterprise-Wide Centralization of Branch Office Infrastructure; Innovative Local Instance Networking Approach Overcomes Traditional Application Acceleration Pitfalls" (available at http://www.businesswire.com/news/home/20050919005450/en/Silver-Peak-Systems-Delivers-Family-Appliances-Enterprise-Wide#.UVzkPk7u-1 (last visited Aug. 8, 2014)).

Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).

Tseng, Josh, "When accelerating secure traffic is not secure" (available at http://www.riverbed.com/blogs/whenaccelerati.html?&isSearch=true&pageSize=38,page=2 (last visited Aug. 8, 2014)).

Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)).

Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)).

Final Written Decision, Dec. 30, 2014, Inter Partes Review Case No. IPR2013-00403.

Final Written Decision, Dec. 30, 2014, Inter Partes Review Case No. IPR2013-00402.

Final Written Decision, Jun. 9, 2015, Inter Partes Review Case No. IPR2014-00245.

"IPsec Anti-Replay Window: Expanding and Disabling," Cisco IOS Security Configuration Guide. 2005-2006 Cisco Systems, Inc. Last updated: Sep. 12, 2006, 14 pages.

Notice of Allowance, Nov. 16, 2016, U.S. Appl. No. 13/288,691, filed Nov. 3, 2011.

Final Office Action, Nov. 21, 2016, U.S. Appl. No. 14/447,505, filed Jul. 30, 2015.

Notice of Allowance, Nov. 23, 2016, U.S. Appl. No. 14/067,619, filed Oct. 30, 2013.

Notice of Allowance, Dec. 5, 2016, U.S. Appl. No. 14/477,804, filed Sep. 4, 2014.

\* cited by examiner

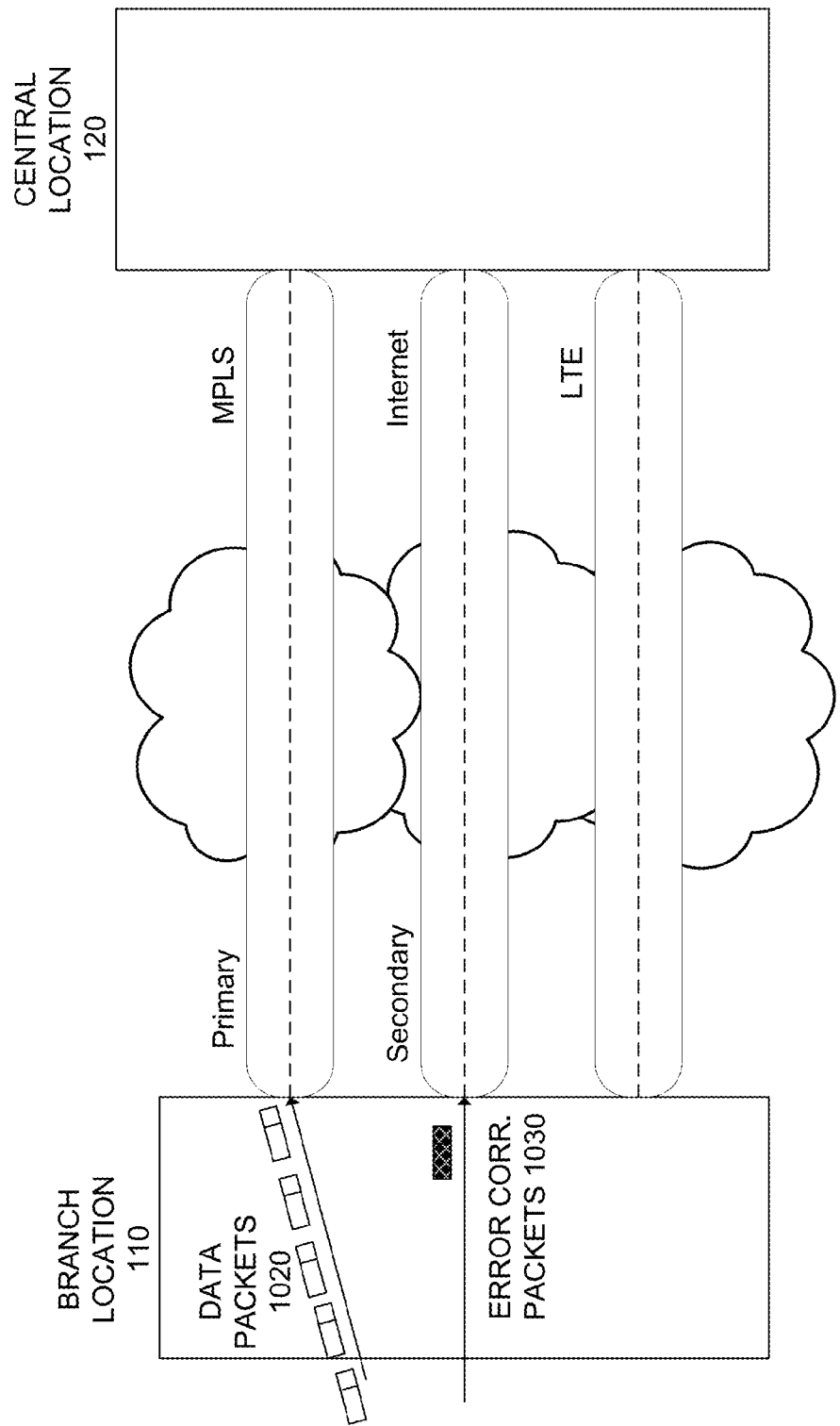

VIRTUAL NETWORK OVERLAY

CROSS-REFERENCE TO RELATED APPLICATIONS

This application is a continuation-in-part of, and claims the priority benefit of, U.S. patent application Ser. No. 14/981,814 filed on Dec. 28, 2015 and entitled "Dynamic Monitoring and Visualization for Network Health Characteristics". This application is also a continuation-in-part of, and claims the priority benefit of, U.S. patent application Ser. No. 14/677,841 filed on Apr. 2, 2015 entitled "Quality of Service Using Multiple Flows" issued on Jul. 19, 2016 as U.S. Pat. No. 9,397,951, which in turn is a continuation of U.S. patent application Ser. No. 14/248,188 filed on Apr. 8, 2014, now issued as U.S. Pat. No. 9,143,455 issued on Sep. 22, 2015, which in turn is a continuation of U.S. patent application Ser. No. 12/217,440 filed on Jul. 3, 2008, now issued as U.S. Pat. No. 8,743,683 issued on Jun. 3, 2014.

The disclosures of the above-referenced patents and applications are hereby incorporated by reference in their entirety for all purposes.

TECHNICAL FIELD

This disclosure relates generally to the creation and managing of virtual network overlays.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Local area networks (LANs) are capable of being segregated into multiple virtual LANs to carry different types of traffic. For example, one virtual LAN may be for guest Wi-Fi, one for a separate network for employees to access company information, one for a separate network for cash registers at a retail location, and one for a separate network for back offices of a retailer. Different types of data can be transmitted on each virtual LAN. However, currently no mechanism exists for creating separate networks for transmitting data over a Wide area network (WAN). Embodiments of the present disclosure describe mechanisms to create, deploy, and transmit data over virtual network overlays for a WAN.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In exemplary embodiments, a method for transmitting data via a virtual overlay network is disclosed. The method comprises receiving at a first network appliance, data to be transmitted across a communication network to a destination, the data comprising a plurality of data packets; classifying the data based on a traffic access policy; assigning an overlay identification to the data based on the classification; determining, based on the destination, a second network appliance to receive the data; selecting a bonded tunnel for the assigned overlay identification and second network appliance, the bonded tunnel being a (virtual) tunnel for the overlay between the first network appliance and second network appliance; and transferring the data packets from the first network appliance via the selected tunnels to an endpoint of the communication network.

One or more of the network appliances may be located in a cloud. Each of the plurality of network appliances is connected to at least one other network appliance via at least one bonded tunnel, the bonded tunnel transporting data for a specific traffic classification specified by the traffic access policy.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

FIGS. 9A-11 depict exemplary bonding policies.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to the simple creation, deployment and management of virtual overlay networks.

I. System Setup

Figure 1:
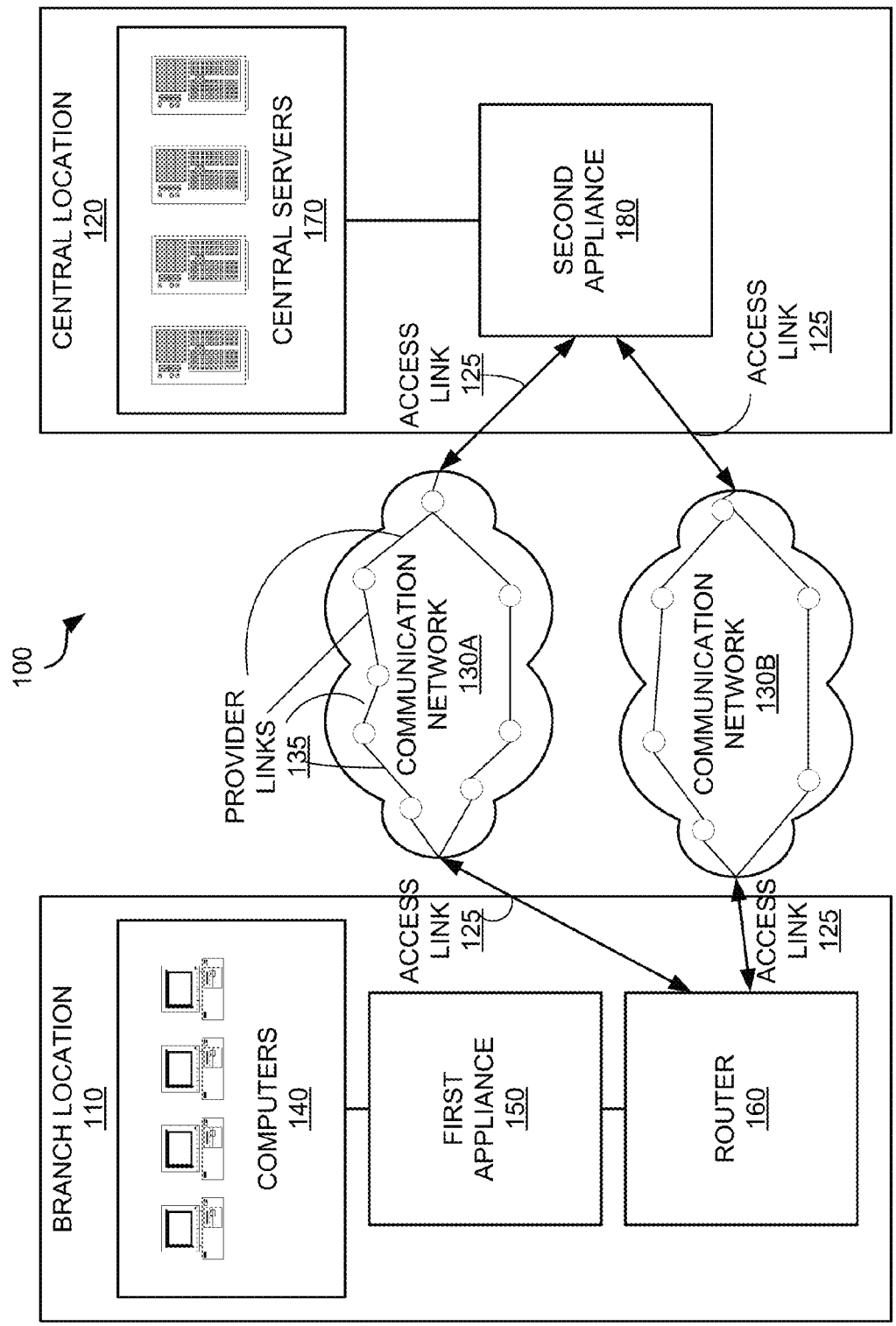
FIG. 1 illustrates an exemplary system with two locations, within which the present disclosure can be implemented.

FIG. 1 illustrates an exemplary system 100, within which the present disclosure can be implemented. The exemplary system 100 includes a branch location 110, a central location 120 (also sometimes referred to as a data center), and two communication networks 130A and 130B. While two communication networks are depicted in exemplary system 100, there can be any number of communication networks, including just one, or three or more.

The branch location 110 includes computers 140, a first appliance 150, and a router 160. In the branch location 110, the computers 140 are linked to the first appliance 150. The first appliance 150 is linked to the router 160, which is coupled to the communication networks 130A and 130B. While only one appliance is depicted in branch location 110, there can be multiple appliances, physical and/or virtual, at branch location 110. Similarly, while only one router 160 is depicted in exemplary system 100, there can be multiple routers, switches, or other equipment (physical or virtual) at branch location 110. Additionally, in some embodiments, first appliance 150 may be in communication with the one or more communication networks directly, instead of through router 160.

The central location 120 in exemplary system 100 includes central servers 170 and a second appliance 180. While the term "server" is used herein, any type of computing device may be used in central location 120. In the central location 120, the central servers 170 are linked to the second appliance 180. The second appliance 180 is coupled directly to the communication networks 130A and 130B. While only one appliance is depicted in central location 120, there can be multiple appliances, physical and/or virtual, at central location 120. Additionally, in some embodiments, second appliance 180 may be in communication with the one or more communication networks through a router, switch, or other physical or virtual equipment, instead of directly.

The principles discussed herein are equally applicable to multiple branch locations (not shown) and to multiple central locations (not shown). For example, the system 100 may include multiple branch locations and/or multiple central locations coupled to one or more communication networks. Branch location/branch location communication, central location/central location communication, central location/cloud appliance communication, as well as multi-appliance and/or multi-node communication and bi-directional communication are further within the scope of the disclosure. However, for the sake of simplicity, the disclosure illustrates the system 100 having the single branch location 110 and the single central location 120, and the respective branch location 110/central location 120 communication.

The communication networks 130A and 130B comprise hardware and/or software elements that enable the exchange of information (e.g., voice, video and data) between the branch location 110 and the central location 120. Some examples of the communication network 130 are a private wide-area network (WAN), and the public Internet. Typically connections from the branch location 110 to the communication networks (e.g., from the router 160 and second appliance 180) are, T1 lines (1.544 Mbps), or broadband connections such as digital subscriber lines (DSL) and cable modems. Other examples are MPLS lines, T3 lines (43.232 Mbps), OC3 (155 Mbps), and OC48 (2.5 Gbps), fiber optic cables, or LTE wireless access connection. One or more of the communication networks 130A and 130B can also be a cloud network or virtual network.

The router 160 and second appliance 180 are connected to the communication networks 130A and 130B via access links 125, sometimes also referred to herein as network access links. The communication networks consist of routers, switches, and other internal components that make up provider links 135, that are managed by the network service providers such as an internet service provider. Access links 125 and provider links 135 can be combined to make various network paths along which data travels. The exemplary embodiment of FIG. 1 depicts two paths through each communication network, showing a total of four network paths for data to be exchanged between the first appliance 150 and second appliance 180. As understood by persons of ordinary skill in the art, there can be any number of network paths across one or more communication networks.

The first appliance 150 and second appliance 180 comprise hardware and/or software elements configured to receive data and optionally perform any type of processing, including but not limited to, WAN optimization techniques to the data, before transmitting to another appliance. The operations of the second appliance 180 may be similar to the operations of the first appliance 150.

As illustrated, the first appliance 150 is configured in-line (or serially) between the computers 140 and the router 160. The first appliance 150 and the second appliance 180 transparently intercept network traffic between the computers 140 and the central servers 170. For example, the second appliance 180 transparently intercepts data sent from the central servers 170 and addressed to the computers 140. The computers 140 and the central servers 170 advantageously require no additional configuration because the first appliance 150 and the second appliance 180 operate transparently.

Alternatively, the first appliance 150 and the second appliance 180 are configured as an additional router or gateway. As a router, for example, the first appliance 150 appears to the computers 140 as an extra hop before the router 160. In some embodiments, the first appliance 150 and the second appliance 180 provide redundant routing or peer routing with the router 160. Additionally, in the bridge and router configurations, the first appliance 150 and the second appliance 180 provide failure mechanisms, such as, fail-to-open (e.g., no data access) or fail-to-wire (e.g., a direct connection to the router 160). If an appliance has multiple interfaces, it can be transparent on some interfaces, and act like a router/bridge on others. Alternatively, the appliance can be transparent on all interfaces, or appear as a router/bridge on all interfaces.

The system 100 advantageously provides increased productivity, reduced IT costs, and enhanced data integrity and compliance. For example, the system 100 achieves the simple administration of centralized server systems whereby the central servers 170 can provide centralized management of business intent, objectives and policies for network traffic throughout all locations. By providing centralized management, the system 100 improves application performance and data access in the branch location 110 and central location 120.

In some embodiments, the system 100 includes one or more secure tunnels between the first appliance 150 and the second appliance 180. The secure tunnel may be utilized with encryption (e.g., IPsec), access control lists (ACLs), compression (such as header and payload compression), fragmentation/coalescing optimizations and/or error detection and correction provided by an appliance.

Figure 2:
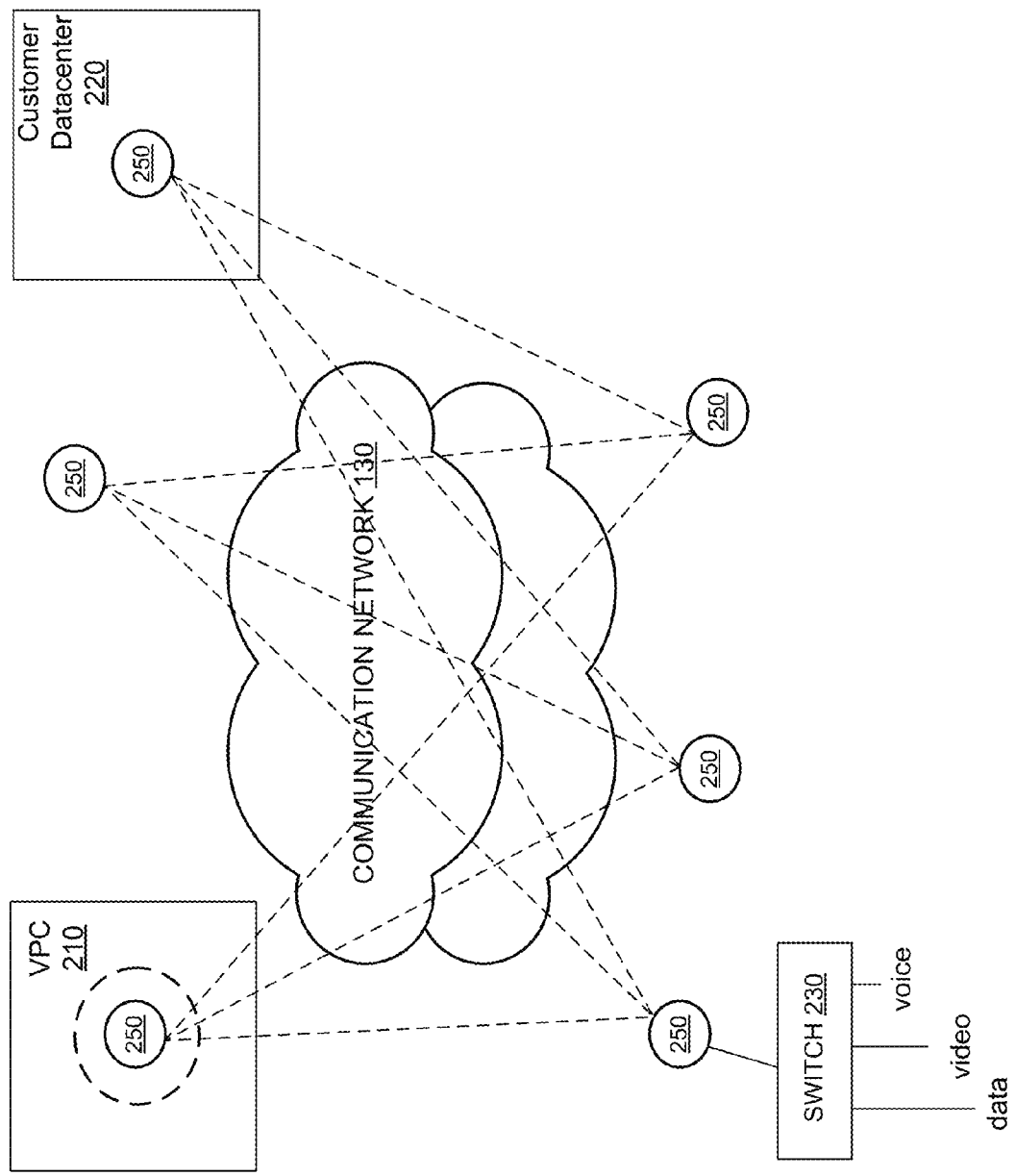
FIG. 2 illustrates an exemplary network for connecting multiple appliances.

An exemplary network for connecting multiple appliances 250 is depicted in FIG. 2. Each appliance 250 can be in communication with other appliances 250, whether they are in a branch location 110, central location 120, private cloud network, customer datacenter, or any other location. In the exemplary embodiment of FIG. 2, a network is displayed where appliances are in communication with each other. As understood by persons of ordinary skill in the art, any type of network topology may be used.

Each appliance can be physical or virtual. In the exemplary embodiment of FIG. 2, a virtual appliance is depicted as being in its own virtual private cloud (VPC) 210, managed by a cloud service provider, such as Amazon Web Services, or others. Another appliance in customer datacenter 220 can be physical or virtual.

As discussed herein, the communication network 130 can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across the underlay network, regardless of which Service Provider manages the routes or provider links. Data from connected devices can travel over this overlay network, which can consist of any number of tunnels or paths between each location.

In an exemplary embodiment, data from computers 140 at branch location 110 may include voice, video, and data. This information is sent through switch 230, and then transmitted by an appliance 250 over the communication network 130 to other connected appliances 250. In some embodiments, voice, video, and data may be received and transmitted on separate LAN or vLAN interfaces, and the appliance 250 can distinguish the traffic based on the LAN/vLAN interface at which the data was received on.

Figure 3:
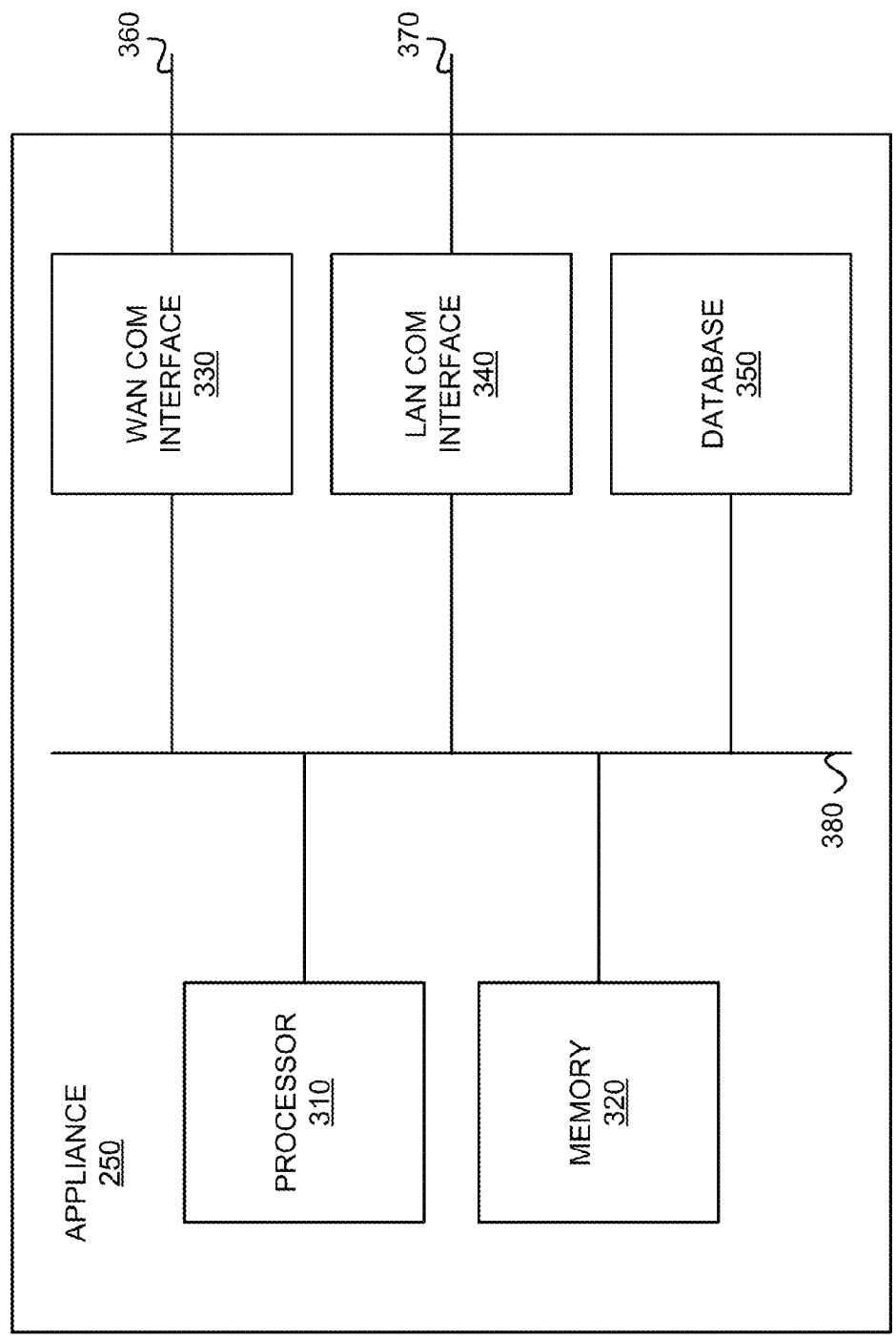
FIG. 3 illustrates a block diagram of an appliance in an exemplary implementation of the invention.

FIG. 3 illustrates a block diagram of an appliance 250, in an exemplary implementation of the invention. The appliance 250 includes a processor 310, a memory 320, a WAN communication interface 330, a LAN communication interface 340, and a database 350. A system bus 380 links the processor 310, the memory 320, the WAN communication interface 330, the LAN communication interface 340, and the database 350. When deployed in a branch location, line 360 links the WAN communication interface 330 to the router 160 (in FIG. 1), and line 370 links the LAN communication interface 340 to the computers 140 in FIG. 1.

The database 350 comprises hardware and/or software elements configured to store data in an organized format to allow the processor 310 to create, modify, and retrieve the data. The hardware and/or software elements of the database 350 may include storage devices, such as RAM, hard drives, optical drives, flash memory, and magnetic tape.

In some embodiments, some appliances comprise identical hardware and/or software elements. Alternatively, in other embodiments, some appliances, such as a second appliance, may include hardware and/or software elements providing additional processing, communication, and storage capacity.

II. Overlay Networks

Figure 4:
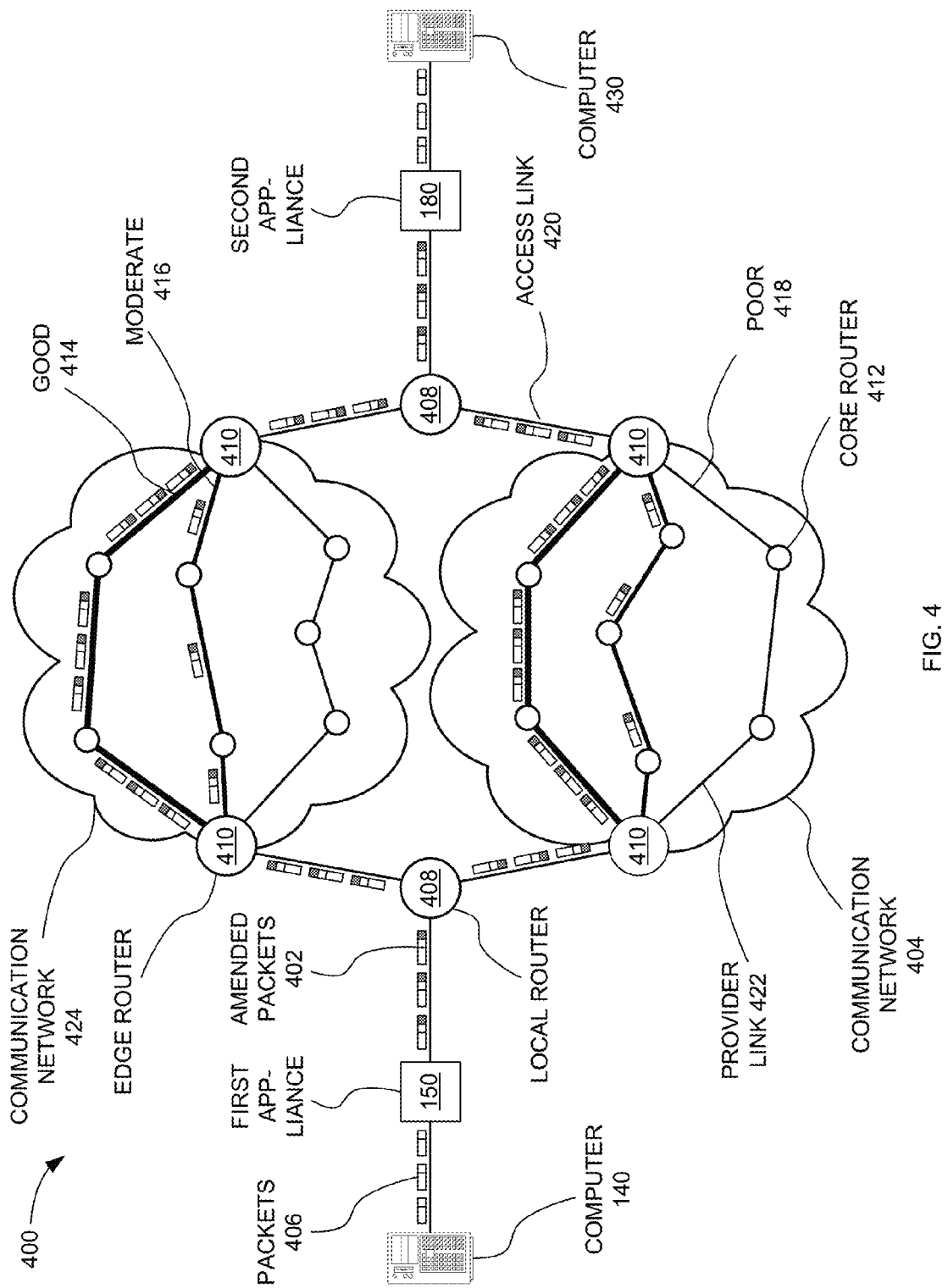
FIG. 4 illustrates an exemplary implementation of data packet transfer over a network using quality of service using multiple flows.

FIG. 4 illustrates an exemplary implementation of data packet transfer over a network using quality of service using multiple flows. An environment 400, as depicted in FIG. 4, may include certain similar elements as the system 100, such as the computers 140 and 430. The environment may also include a communication network 424, a communication network 404, as well as the various routers (e.g., the local routers 408, the edge routers 410, and the core routers 412). The communication networks 404 and 424 are composed of provider links, such as provider link 422, similar to provider links 135 of FIG. 1. Access link 420 may be used by a networked device to access the communication network 404. The environment 400 also includes a first appliance 150, positioned between the computer 140 and one of the local routers 408. The second appliance 180 is positioned between the computer 430 and another local router 408.

In some embodiments, the first appliance 150 may amend the packet 406 received from the computer 140 via the inter-computer flows to affect which inter-device flow the packet is directed to, this resulting in an amended packet 402. According to one embodiment, the packet 406 is amended such that an additional header portion is added to the packet 406, while according to another embodiment, the packet 406 is amended such that certain information in the header portion is altered or replaced (sometimes called encapsulation or tunneling to create tunnel packets). The amended packet 402 may be restored to the packet 406 upon receipt by the second appliance 180. After which, the packet 406 may be delivered to the computer 430 on the inter-computer flow from which it originated. Again, it is noted that the first appliance 150 may be equivalent to, and interchangeable with, the second appliance 180 in that any task or procedure carried out by the first appliance 150 may be carried out by the second appliance 180, and vice versa.

The data paths of environment 400 may be of varying quality, such as a good flow 414, a moderate flow 416, or a poor flow 418. Quality of a given path may be determined by certain metrics. As mentioned herein, the metrics may include latency, re-ordering, jitter, and/or loss of packets, and may be referred to as a latency metric, a re-ordering metric, and a loss metric, respectively.

The latency metric may simply be described as a time required for the packet to reach a destination. In some cases, the latency metric may be related to round-trip time (RTT). Many different communication network delays may comprise the latency metric. For example, a processing delay is time taken by various routers (e.g., the local router 408, the edge router 410, and the core router 412) to process the header of the packet. A queuing delay may be time that the packet spends in routing queues. Time required to push the packet into a physical link connecting the various routers may be referred to as a transmission delay. Lastly, a propagation delay is time required for a signal comprising the packet to propagate through a medium (e.g., a wire, a cable, or air) used to transmit the packet.

The re-ordering metric determines a level of re-ordering of the packets that is required upon arrival of the packets at the destination, in exemplary embodiments. To illustrate, when a plurality of related packets are transmitted across the communication network(s), different packets may be directed to different paths. This may be due to packets from a single flow being directed to more than one path, for example. The plurality of related packets may resultantly arrive at the destination in a different order than as sent. Thus, the plurality of related packets may require re-ordering. The re-ordering of packets may have a dramatic impact, for example, on VoIP and video data streams, and TCP/IP data streams.

The loss metric quantifies packet loss, which occurs when one or more packets being transmitted across the communication network fail to reach the destination. Packet loss may be caused by a number of factors, such as signal degradation, oversaturation of the communication network, corrupted packets being rejected in-transit, faulty communication networking hardware, and maligned system drivers or communication network applications. The loss metric may also take into account bit error and/or spurious packets. Although the latency metric, the re-ordering metric, and the loss metric are described herein, other metrics may comprise the flow metrics and still fall within the scope of the present invention.

The paths or tunnels in environment 400 may be categorized based on various flow metrics. These flow metrics may be related to, for example, latency, re-ordering, jitter, and/or loss of packets, among other metrics. The packets may be directed to tunnels having preferable metrics without any specific knowledge or concern of the communication network, protocols, or computers thereof.

Classifying the flows based on the flow metrics may aid the appliances 150 and 180 in determining which packets should be directed to which inter-device flows. For example, the inter-device flows may be grouped into three classifications. A first classification may be associated with inter-device flows having preferable flow metrics, which exhibit excellent performance in transferring the packets. The first classification may be reserved for packets having highest priorities. A second classification may be ascribed to inter-device flows having slightly less preferable flow metrics, relative to the first classification, but nevertheless acceptable. Packets that must be transferred, but that are less essential, may be directed to the inter-device flows having the second classification. Poorly performing inter-device flows, having less than desirable flow metrics, may be used only sparingly. However, in one example, at least some packets may be directed to each inter-device flow in order to determine the flow metrics.

As shown in FIG. 4, the amended packets 402 may advantageously be more heavily distributed to the inter-device flows having preferable flow metrics (e.g., the good flow 414). The moderate flow 416 may transfer less of the amended packets 402, while the poor flow 418 may transfer even fewer.

Embodiments of the present invention also allow for centrally assigned business intent policies to be implemented throughout an organization's entire network, to secure and control all WAN traffic for the organization. Software defined WAN (SD-WAN) overlay networks can be created independently from the physical network, and from each other. Topology, security, and forwarding rules can be specified independently for each overlay. This design allows for high-scale and secure application segmentation. Each overlay scales automatically as endpoints are added to the SD-WAN fabric, and configuration integrity is maintained as each site maps a local profile into a global overlay.

Figure 8:
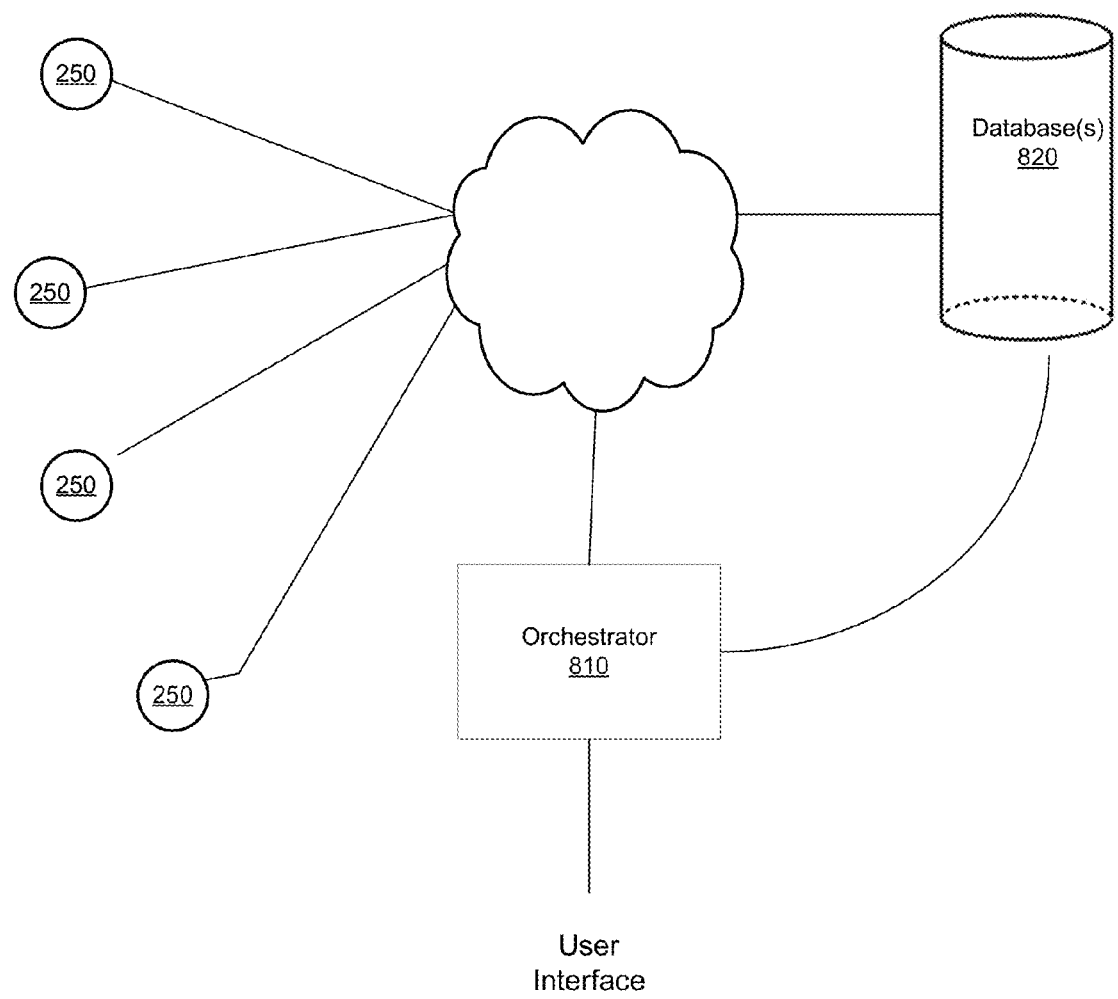
FIG. 8 depicts an exemplary setup of an orchestrator in communication network appliances.

All of the overlay networks, labels, and corresponding ports, subnets and vLANs can be maintained in one or more databases in communication with an orchestrator device, as depicted in FIG. 8. The orchestrator 810 can be hardware and/or software, and be in communication with each of the networked devices, such as the appliances 250, as well as in communication with the database(s) 820.

In exemplary embodiments, the orchestrator may maintain information regarding the configuration of each appliance at each physical location. In this way, the orchestrator can create, manage and deploy the business objectives for network traffic throughout the network of connected devices. For example, if a higher priority is designated for voice traffic at each location, the orchestrator can automatically configure the corresponding network interfaces at each location accordingly.

By having knowledge of the configuration of each appliance in the network, the orchestrator 810 can also create and manage all of the bonded tunnels in the enterprise network, each bonded tunnel carrying a particular type of network traffic between each source-destination appliance pair. The orchestrator 810 can automatically configure the enterprise network by determining which overlay and underlay tunnels need to be set up, and automatically creating them based on the network nodes and overlays.

Figure 5:
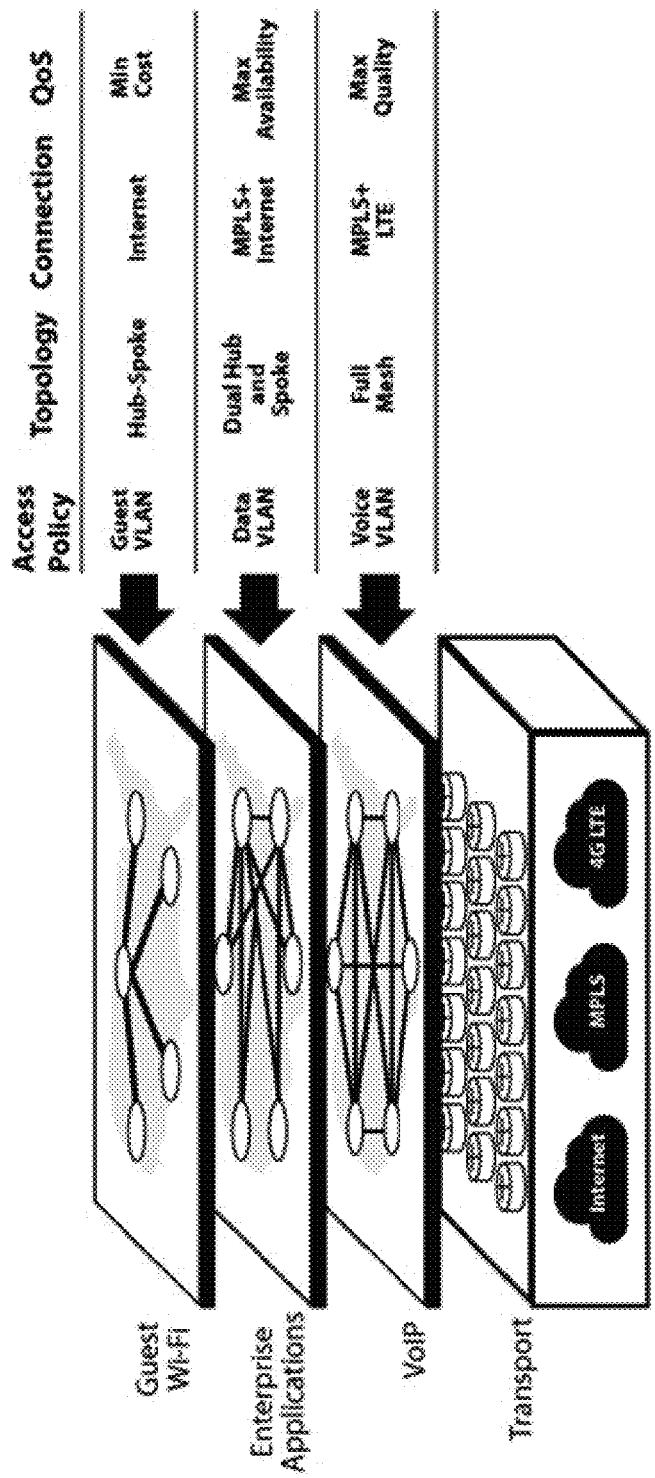
FIG. 5 illustrates an exemplary infrastructure serving individual needs of separate overlays.

FIG. 5 illustrates an exemplary infrastructure (physical MPLS, Internet and cellular networks) serving individual needs of separate overlays. In this case, there are three separate overlays for Guest Wi-Fi, Enterprise Application, and Voice over IP (VoIP). The overlays apply globally to the enterprise network, and the local profiles for each appliance describe how to map incoming traffic onto each overlay. While in this embodiment, vLAN is used as the access policy, other methods can be used such as access control lists, network interface, etc.

In the exemplary infrastructure of FIG. 5, different topologies and behaviors define the requirements of these applications. For instance, a business may not want the same topology for CRM applications as for voice-over-IP (VoIP) applications. A dual hub and spoke configuration, with each of two data centers acting as hubs, would make sense for CRM, whereas VoIP typically would be configured in a full mesh to each destination.

Business intent overlays follow, and benefit from, the operational models of compute virtualization. They allow for maintenance of independence from the physical layer because the overlay decouples the delivery of business intent and applications from the vendor choice and hardware refresh cycle of the underlay (physical network of switches and routers). Furthermore, secure physical, virtual, and control networks are isolated because each overlay describes a logical network for the application that can have a different topology—including addressing and access control—from the physical network. In addition, high availability (HA) and ample bandwidth are facilitated via integration with route policies including dynamic path control (DPC) techniques that emphasize HA, maximum throughput or load balancing; applications are segmented according to required service-level guarantees such as minimum bandwidth or Quality of Service (QoS). Application visibility also provides full knowledge and control of all applications crossing the enterprise WAN with real-time graphs at the Layer 7 application level, including web services over HTTP(s).

Figure 7A:
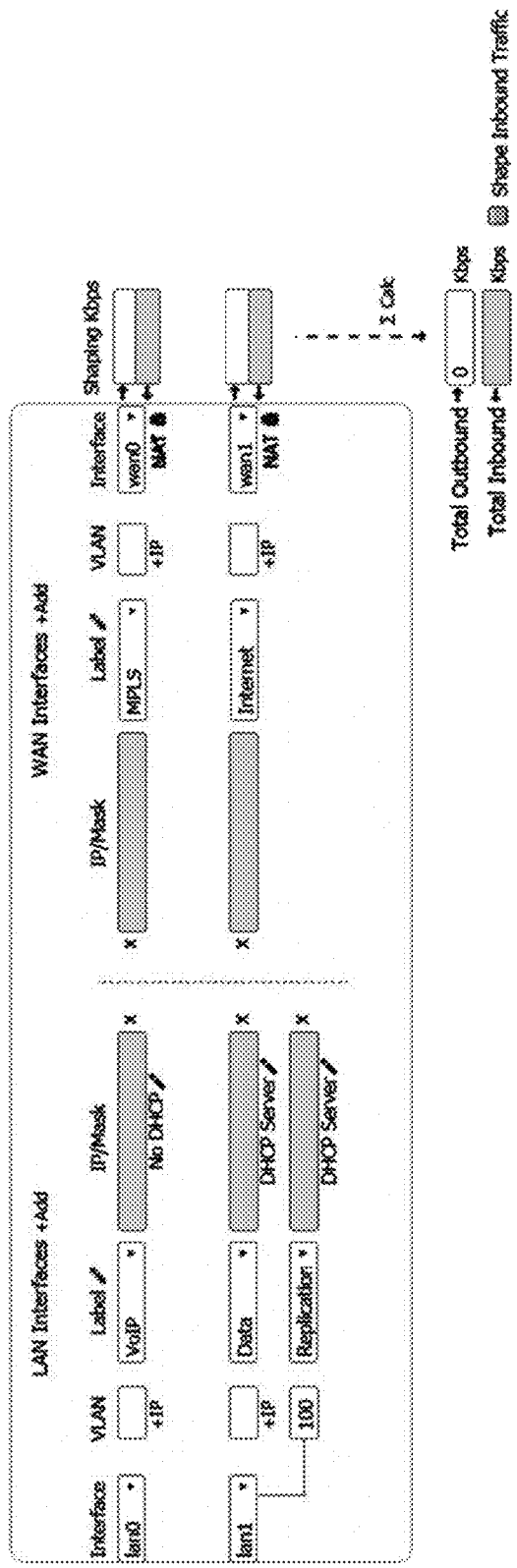
FIGS. 7A-7B depict an exemplary graphical user interface that a network administrator may use to assign labels to different network interfaces.

FIG. 7A depicts an exemplary graphical user interface that a network administrator may use to assign labels to different network interfaces of an appliance, such as appliance 250. In the figure, the LAN ports and the WAN uplinks that are available in a small branch location profile are depicted. LAN ports have interface labels assigned to them that describe the traffic types and applications that will use them. For instance, voice traffic is assigned to lan0, and the different vLANs on lan1 carry data and replication traffic.

The interfaces are also labeled on the WAN side. Here, want connects to the public Internet, and wan0 connects to an MPLS service. Both WAN interfaces are encrypted and the Internet uplink is configured for Network Address Translation (NAT). Combining these port configurations into a single profile simplifies the installation process for the appliance at the branch location and prevents configuration errors. This profile could be applied to all appliances with certain branch types, so each branch does not have to be configured independently. For example all front end office locations of an organization may have one profile associated with a branch type, while backend or central office locations of an organization may have a different profile. By creating these profiles, the orchestrator 810 is informed as to which interfaces of the appliance 250 are used for what purpose.

Figure 7B:
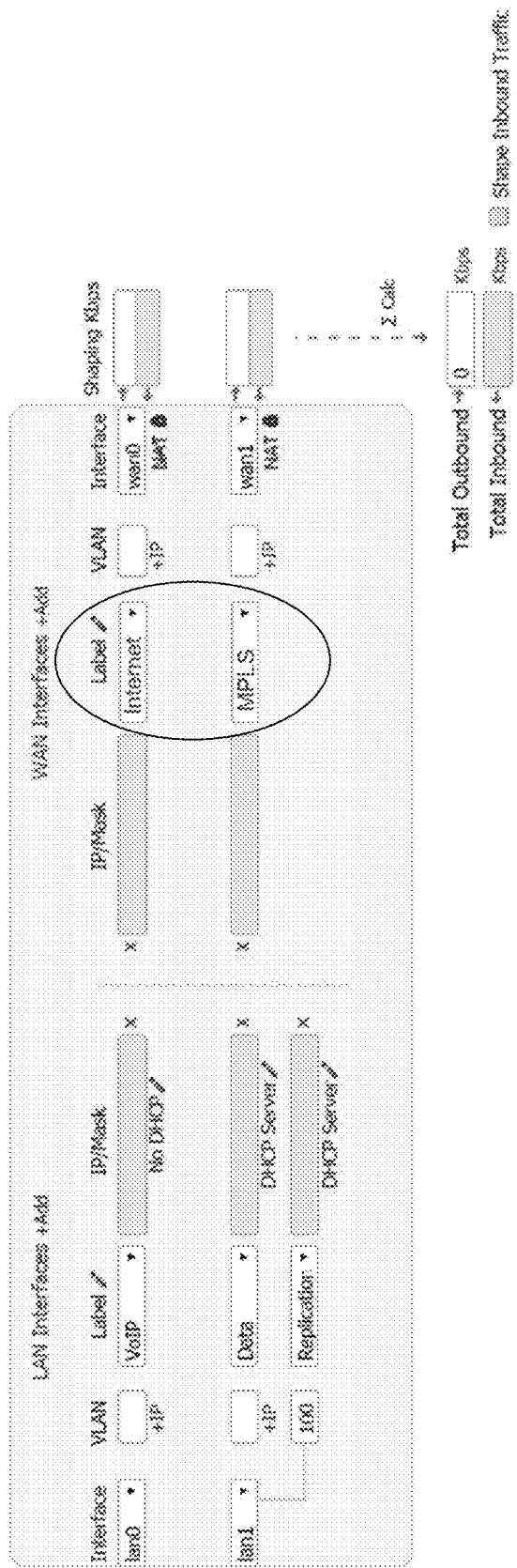

Unlike conventional systems, network interfaces of appliance 250 are assigned labels in addition to individual port names. This facilitates end-to-end consistency and the ability to define the behavior of these interfaces by labels. Additionally, some local overrides can be made to the profile when applying it to the branch location. For example, an administrator can change the WAN links (swapping wan0 and wan1) to match how the appliance is physically connected. In the exemplary embodiment depicted in FIG. 7B, wan0 is now connected to Internet and wan1 is connected to MPLS. Even though the appliance may be physically connected in a different way than an appliance at other branch locations, since each interface is labeled and traffic is transmitted according to label, the traffic can still be seamlessly transmitted to other appliances. Furthermore, the automation system can still be applied throughout the organization's network of connected devices since the interfaces are labeled. Thus, even though appliances at different locations may be connected differently, the orchestrator 810 can still automate configuration of appliances to implement network objectives and business intent.

Figure 7C:
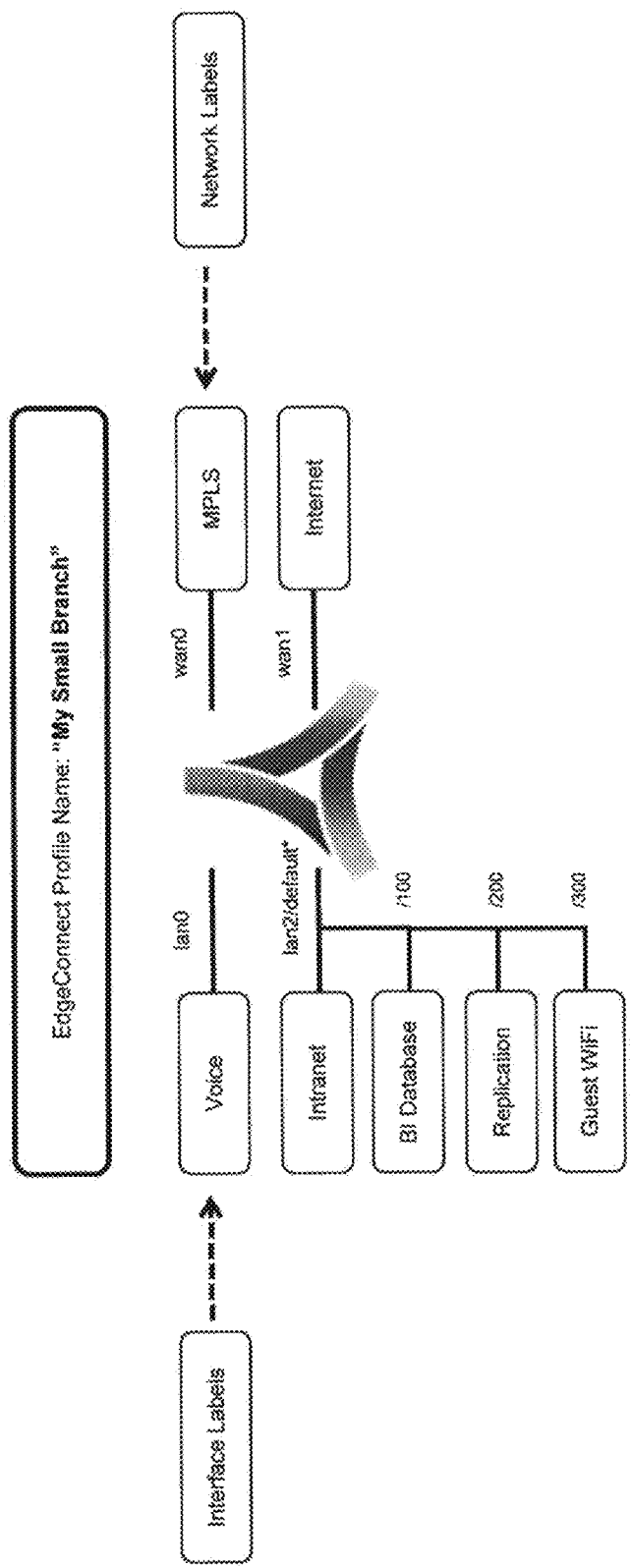
FIG. 7C depicts an exemplary appliance with interface labels.

FIG. 7C depicts an exemplary appliance 250 with interface labels. Each LAN and WAN interface is labeled with a particular type of traffic, and each label is associated with a separate overlay network to carry that type of traffic. For example, voice traffic may be transmitted over one overlay, data traffic over another, and guest Wi-Fi may be a third overlay network. At each location, such as a branch location, a network administrator may label the type of traffic handled at each network interface. In the exemplary setup for the appliance in FIG. 7C, LAN interface lan0 handles voice traffic, wan0 interfaces with the MPLS link and want interfaces with the public Internet. The lan2 interface in FIG. 7C has multiple virtual LANs, each carrying a different type of traffic: intranet, BI Database, replication, and guest Wi-Fi.

However, at a different location, such as at a second branch location, the interfaces of appliance 250 may be configured differently such that wan0 is the Internet link and wan1 is the MPLS link. Every site of a company could be configured differently because a person has to physically setup and configure the equipment at each location. Thus, if a company has multiple locations, there may be no uniformity as to which port of an appliance 250 handles each type of traffic at each location.

Since each site has its appliance network interfaces labeled, an organization's business intent can be quickly applied to all appliances at all locations, such that traffic is handled according to the specified business intent uniformly throughout the organization. A network administrator may simply decide to take a certain action with voice traffic throughout all or a portion of the network of connected locations without any other specific configuration required. A central computer connecting to a database, referred to herein as orchestrator 810, keeps track of each branch location's configuration regarding which interface is assigned to which label, so that the computer knows which specific ports and interfaces are affected at each location, thus allowing for automation of appliance configuration based on business intent. In conventional systems, a network administrator would need to know which port handles voice traffic at each location in order to take any system-wide action with voice traffic specifically. Since every location has different addressing and configuration, this can become cumbersome for a large number of appliances. By labeling each network interface based on traffic type at initial setup of an appliance, automated management of all appliances uniformly can occur based on intent, instead of managing each device independently.

Furthermore, by connecting appliances in an overlay network by associating labels with network interfaces (physical ports, virtual ports, endpoint of vLANs, subnets, etc.), the network administrator can describe a business intent (for example to give voice traffic a higher priority), and the system automatically knows which ports, vLANs, and subnets are affected through the use of a consistent label throughout the entire network of connected devices. In this way, a network administrator can assign a different priority to a particular type of traffic (such as voice traffic), compared to other types of traffic.

By utilizing labels for each type of traffic, overlay networks for each can be easily created and configured by a network administrator. Rules for transmitting each type of traffic over a network can be written that are then automatically applied to every location in the network, without the network administrator having to know the specific network address or port for each type of traffic at each destination device.

For example, an organization may prefer that voice traffic be transmitted over MPLS. The orchestrator 810 knows how to identify voice traffic at each location and which interfaces at each appliance 250 in every location use MPLS, so the orchestrator 810 can automatically configure every appliance to direct voice traffic over the MPLS communication network, regardless of whether MPLS is connected to port lan1, wan0, etc.

Figure 6:
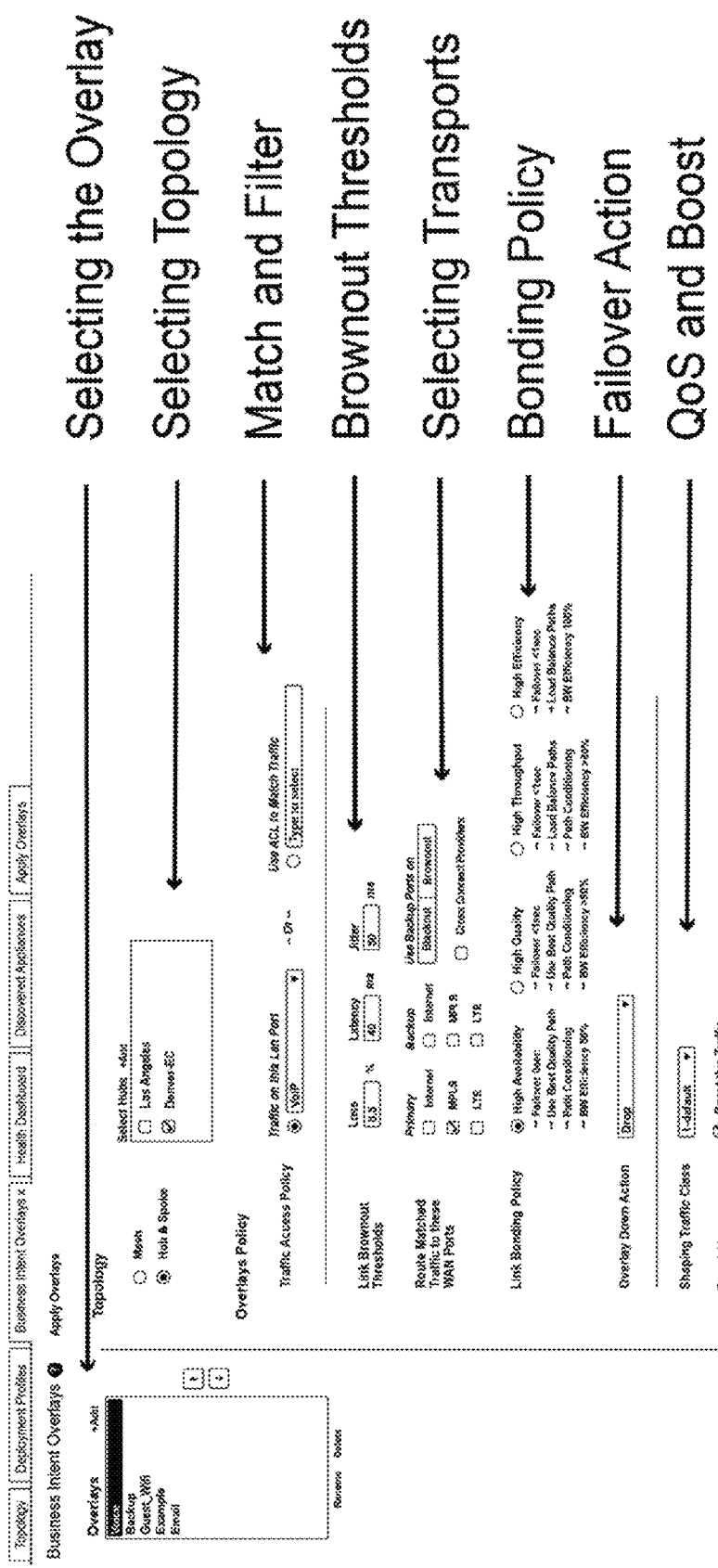
FIG. 6 depicts an exemplary graphical user interface that a network administrator may use to create and implement an overlay network.

FIG. 6 depicts an exemplary graphical user interface that a network administrator may use to create and implement an overlay network based on business intent. For each separate overlay network, the network administrator defines the network topology to be used, a traffic access policy, brownout thresholds for an access link type, primary access link, secondary access link, condition for use of backup ports, bonding policy, failover action, quality of service desired, and boost license. In exemplary embodiments, the user interface appears on a single-screen. In this way, a network administrator can define and implement business intent across all locations. Each of these parameters will be discussed in more detail below. The selection of each of these fields can be applied to each specific site in an organization's network of connected devices, as discussed herein.

As a person of ordinary skill in the art would understand, other exemplary embodiments may include fewer or additional fields for the creation and implementation of the overlay network in the graphical user interface.

III. Bonded Tunnels

There can be multiple provider links, made up of routers and switches, connecting devices in different locations, as explained herein and known to persons of ordinary skill in the art. Physical provider links, which make up paths, are part of one or more core networks, sometimes referred to as an underlay network. These provider links can be managed by different service providers, such as Internet Service Providers.

For example, within an MPLS network, there can be multiple provider links managed by a MPLS service provider. There can also be an access link connecting a device to the MPLS network. Other access links can connect a device to other networks, such as cable, DSL, or wireless networks such as LTE.

There may be tunnels, carrying packets such as IPsec packets, over each of these provider links from a source device to a destination device. Sometimes these tunnels are referred to as an overlay network in the art, but these tunnels are referred to herein as underlay tunnels.

In some embodiments of the present disclosure, further bonded tunnels are used as an additional layer of tunnels on top of the underlay tunnels to carry data from a source to a destination. In conventional systems, data entering the wide area network, such as data entering by switch 230, loses its segregation at the edge router 410, and becomes mixed with all other network traffic. However, in embodiments of the present invention, separate bonded tunnels can be used for each type of data traffic, such that each type of data traffic can remain separate across the network and arrive as a separate flow at the destination site. While three streams are discussed here (voice, video, and data), any number of streams can be used in this manner.

For example, an organization may have all of their financial data on one overlay, and data regarding building maintenance systems on another overlay. These two data streams are in no way related, and a person accessing one set of data does not need to access the other set of data. To keep them separate, a separate bonded tunnel can be used to transmit each type of data and keep the data segregated. In a further example, a retailer may have cash registers at a store location connected to a network to transmit and receive data. A back office computer may transmit different data to a head office or central location. These data streams can be kept separate by being transmitted over different bonded tunnels of an overlay network.

Each type of network traffic can remain separate through the use of labels for data from each interface of an appliance, as discussed herein. Thus, all video traffic from a particular device may be assigned a label of "video" and the data packets are amended by the appliance to include an overlay ID that corresponds to the label, in the header of each data packet from that network interface. In this manner, the data packets from each network interface are designated for transmission via separate bonded tunnels, in accordance with the business intent for the organization. While labels are described herein as being assigned according to network interface, separation can also occur based on other methods. For example, application access control lists can be used to distinguish voice data from video data, even though both data flows may arrive on the same network interface.

This second layer of tunnels is a virtual network, and allows for the creation of additional overlay networks over the provider links and underlay tunnels, regardless of which Service Provider manages the physical components. Data from connected devices can travel over these overlay networks, which can consist of any number of tunnels.

Figure 15A:
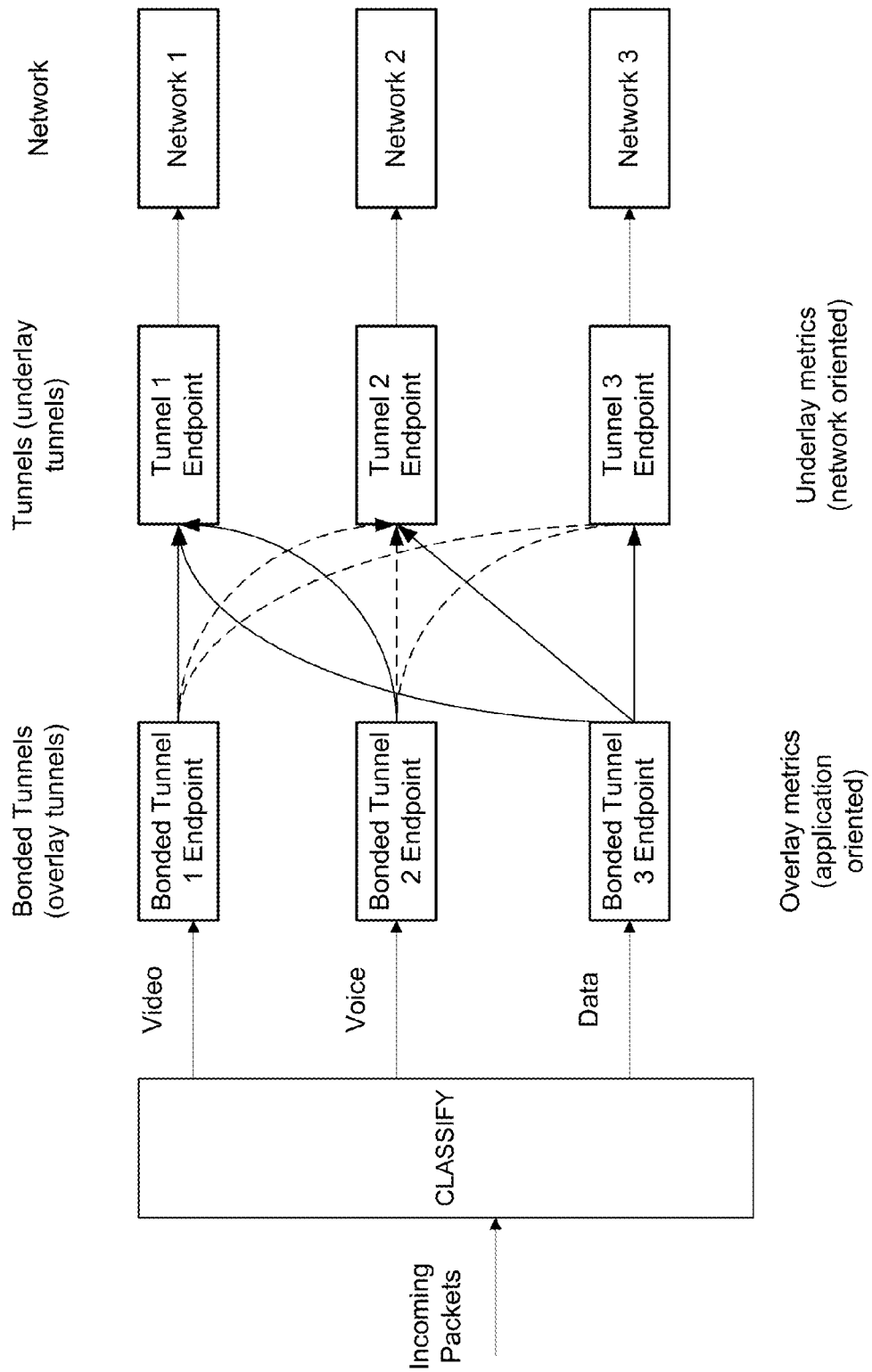
FIG. 15A depicts an exemplary system for data transfer using bonded tunnels and underlay tunnels.

FIG. 15A depicts an exemplary system for data transfer in this manner. Incoming data packets are first received and then classified in accordance with a traffic access policy. In exemplary embodiments, the classification can be based on a traffic access policy, which in turn can rely on information in the packet and the network interface at which the traffic is received. Based on the classification, an overlay ID is assigned, and the packet headers can be amended accordingly to designate the overlay ID. The overlay ID denotes which overlay network the data is designated to utilize. In other embodiments, classification can be based on a label of the network interface of the incoming stream.

A destination appliance to receive the data is determined, and a bonded tunnel is selected for the overlay network and the source-destination pair. Each data packet is then directed to an appropriate bonded tunnel endpoint associated with that overlay network's bonded tunnel between the source and destination appliances. For example, if a source appliance is located in San Francisco and a destination appliance is in New York City, data packets from San Francisco destined for New York City that are labeled as video data are transmitted to an endpoint of bonded tunnel 1, voice traffic is sent to an endpoint of bonded tunnel 2, and regular data traffic is sent to an endpoint of bonded tunnel 3. Thus, even though the traffic is going from the same source to the same destination, a different bonded tunnel is used for each traffic type. While one bonded tunnel is depicted for each overlay in FIG. 15A, there can actually be many bonded tunnels to various destinations (i.e. one bonded tunnel for each overlay from San Francisco to New York City, one bonded tunnel for each overlay from San Francisco to Boston, etc.).

From a bonded tunnel, the network traffic is dynamically assigned to an endpoint of a second underlay tunnel, of the underlay network (for example, on a packet by packet basis). Tunnel 1 may utilize network 1, tunnel 2 utilizes network 2, and tunnel 3 utilizes network 3. While three tunnels and three networks are depicted here, there can be any number of tunnels and networks.

Each overlay network can use any one or more of the underlay tunnels. The bonding policy may dynamically determine which tunnel is selected as one or more primary tunnel and one or more secondary tunnels. This determination may also occur on a packet by packet basis. Further, a bonded tunnel can load balance its traffic over multiple underlay tunnels.

The underlay tunnels are qualified based on tunnel metrics, bonding policy, business intent, and/or quality of service desired. That is, a determination is made as to which underlay tunnel(s) are acceptable based on the metrics and quality of service desired. Thus, each overlay can use different underlay tunnels, based on network performance determined from measured metrics. In various embodiments, an overlay network can send data through multiple underlay tunnels at the same time, in a packet by packet manner, load balancing over each of the underlay tunnels. In other embodiments, multiple underlay tunnels may be used on a flow-by-flow basis (i.e., packets of a certain flow all travel over the same underlay tunnel). Further, sticky flows may be used such that every packet on a given flow gets transmitted across the same underlay tunnel until network conditions or loading trigger a reassignment.

In various embodiments, data packets can be transmitted across all, or any portion of, qualified underlay tunnels. From each underlay tunnel's endpoint, the traffic is sent to the appropriate network through a network service provider. In this way, the system allows for the selection of a network to be utilized for the data packets associated with a label and profile based on business intent and network performance, without controlling the routing through the physical network provider links of each individual network. Underlay tunnels may carry traffic for different overlay tunnels, i.e. traffic for voice overlay and traffic for data overlay.

Figure 15B:
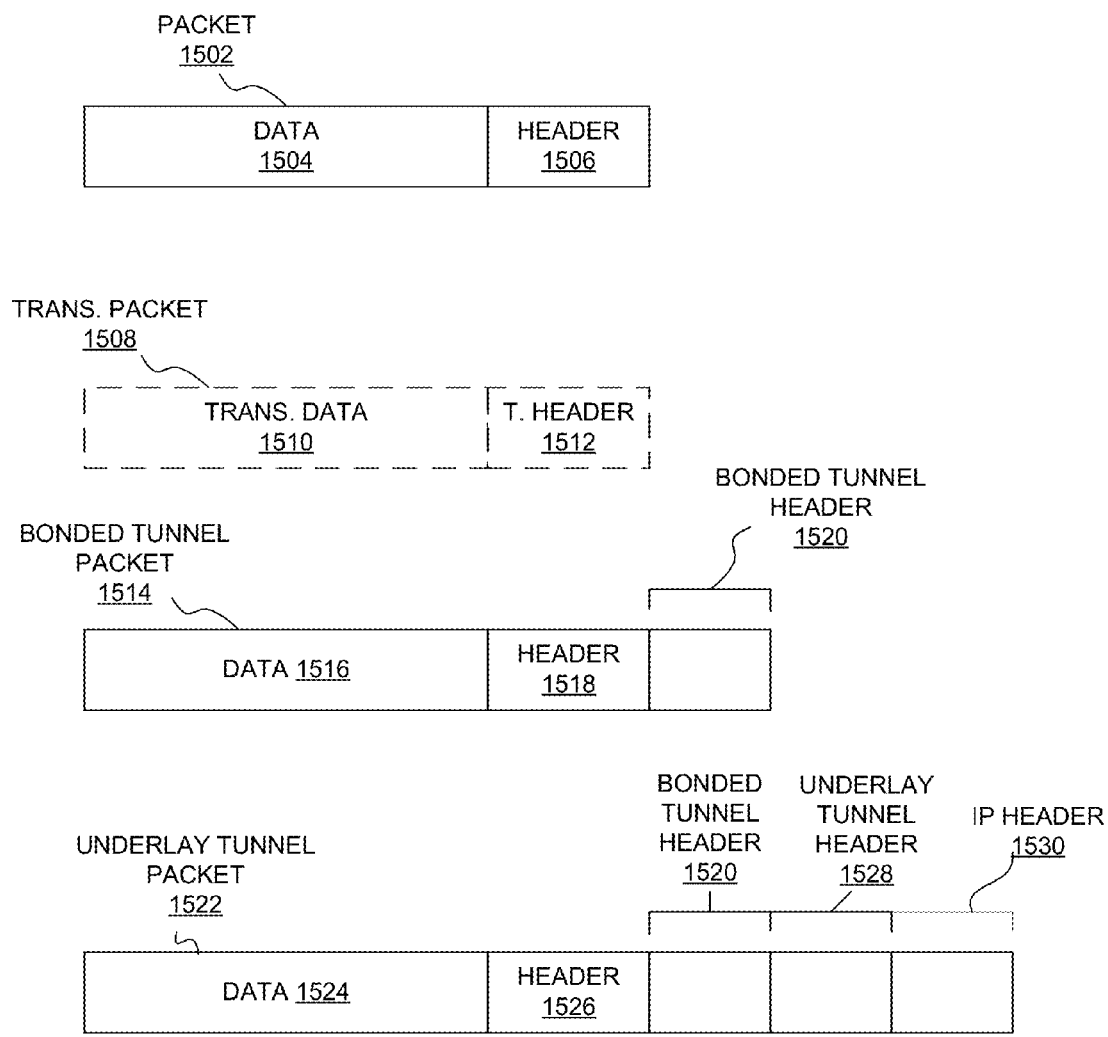
FIG. 15B depicts an exemplary illustration of an original packet and amended packets.

FIG. 15B is an exemplary illustration of original packet and amended packets. Original packet 1502 may be a regular data packet received at an appliance for transmission. Packet 1502 may be received at either the LAN interface or the WAN interface of an appliance. Packet 1502 is composed of the data 1504 (sometimes referred to as payload), and a header 1506. As known to those of ordinary skill in the art, the data portion 1504 comprises information to be transferred from one location to another via one or more communication networks. The header portion 1506 comprises information such as network addresses of a sender and a recipient, and a protocol governing a format of the data portion 1504. Contents of the header portion 1506 may be specified by a protocol of the communication network(s) used for transmission. For example, transmission control protocol (TCP) may specify the header 1506 to include a source port, destination port, a sequence number, an acknowledgment number, and various flags.

In some embodiments, the received packet 1502 may optionally be transformed to generate transformed packet 1508, composed of transformed data 1510 and transformed header 1512. Transformation may include any manipulation of the packet, such as encryption/decryption, compression/decompression of payload and/or header, fragmentation/coalescing optimizations and/or error detection and correction provided by an appliance.

Within the appliance, the packet is then classified and delivered to an endpoint of a bonded tunnel, as discussed in FIG. 15A. A bonded tunnel packet 1514 is generated, comprising data 1516, header 1518 and bonded tunnel header 1520. Data 1516 may be the same or substantially similar to data 1504 or transformed data 1510. Header 1518 may be the same or substantially similar to header 1506 or transformed header 1512. Bonded tunnel header 1520 comprises bonded tunnel specific information, including but not limited to, an overlay ID for the associated overlay network, a time stamp and sequence number. Bonded tunnels are also sometimes referred to herein as overlay tunnels. While bonded tunnel header 1520 is shown in addition to header 1518 in FIG. 15B, bonded tunnel header 1520 may actually be an amendment or replacement of header 1518 in various embodiments.

Analysis of the information in the bonded tunnel header 1520 yields information regarding delay, order, and latency for the bonded tunnel, which is the tunnel created by the orchestrator 810 between two locations for the overlay network. Since data packets on a single bonded tunnel can travel over numerous paths to travel from one location to another (for example, from San Francisco to New York City), a bonded tunnel metric is essentially a single measurement reflecting the performance of all available paths between the two locations. Thus, the bonded tunnel metrics are application oriented, and represent the performance that an end application experiences, regardless of the specific provider links utilized by the underlay network.

Within the appliance, a data packet is then delivered to an endpoint of an underlay tunnel, as shown in FIG. 15A. An underlay tunnel packet 1522 is generated, comprising data 1524, header 1526, bonded tunnel header 1520, underlay tunnel header 1528, and optionally an IP header 1530. Data 1524 may be the same or substantially similar to data 1516 in the bonded tunnel packet 1514. Header 1526 may be the same or substantially similar to header 1518 in the bonded tunnel packet 1514. Bonded tunnel header 1520 is the same as in bonded tunnel packet 1514. Underlay tunnel header 1528 comprises underlay tunnel specific information, including but not limited to, a time stamp and sequence number. While underlay tunnel header 1528 is shown in addition to header 1526 and bonded tunnel header 1520 in FIG. 15B, underlay tunnel header 1528 may actually be an amendment or replacement of header 1526 and/or bonded tunnel header 1520 in various embodiments.

Analysis of the information in the underlay tunnel header 1528 yields information regarding loss, order, and latency for the underlay tunnel utilized by underlay tunnel packet 1522. Thus, the underlay tunnel metrics are network oriented, and represent the actual performance of a particular tunnel within a communication network.

By having both a bonded tunnel header 1520 with a timestamp and sequence number, and an underlay tunnel header 1528 with a time stamp and sequence number, two levels of performance metrics can be separately measured and evaluated—network specific metrics, and application performance metrics. That is, the performance experienced by an application can be measured, along with the performance of a particular communication network facilitating that application.

An IP header 1530 may also be a part of the underlay tunnel packet 1522. The IP header 1530 may contain standard information for the protocol, such as source IP and port and destination IP and port. Optionally a data packet may be encrypted, and an IPsec header can also be added to underlay tunnel packet 1522. While these headers are depicted as additional headers in FIG. 15B, they may actually be an amendment or replacement of header 1526 in various embodiments.

Figure 16:
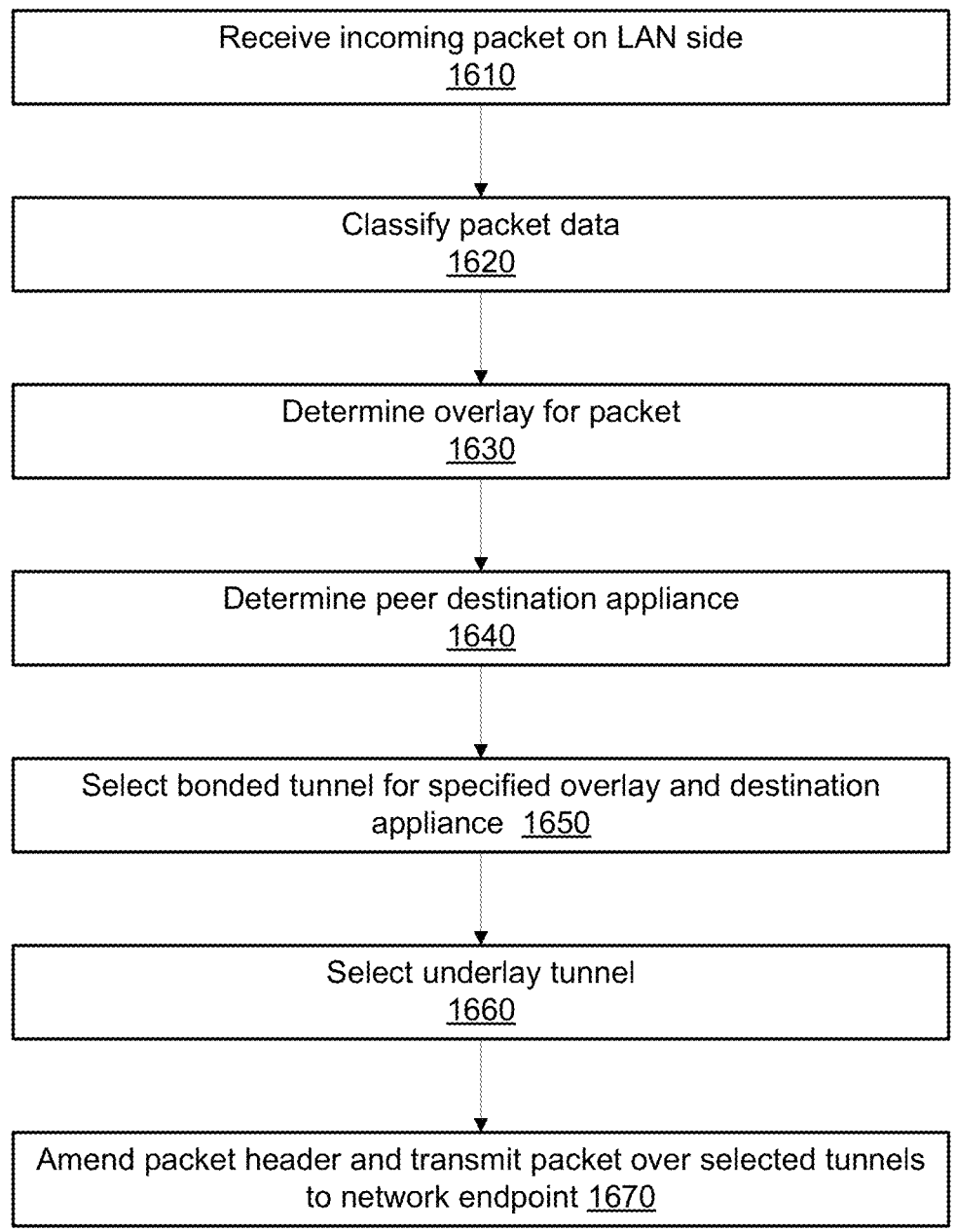
FIG. 16 depicts an exemplary method for an appliance to process packet data.

FIG. 16 depicts an exemplary method for an appliance, such as the appliance 250 of FIG. 2, to handle packet data. In step 1610 an incoming packet to be transmitted is received by an appliance, usually on the LAN side of the appliance. The incoming packet may be received directly from a computer, server, or from a router or switch, such as switch 230 of FIG. 2. In step 1620 the packet is classified in accordance with a traffic access policy. The traffic access policy could be based on the label of the network interface, or a more complex policy using a variety of packet inspection techniques. For example, the incoming traffic may already be mixed and the appliance would need to separate it out into traffic classifications (for example, voice, video, and data) using a combination of traffic statistics and packet content.

In step 1630, the overlay ID is determined from the classification. The peer destination appliance is also determined, usually based on information from the packet header, in step 1640. In an exemplary embodiment, the destination address is retrieved from the packet header and a routing table is used to determine the closest peer destination appliance. The peer destination appliance may be a short distance from the source appliance, or may be across the country or world. In step 1650 a bonded tunnel is selected for the specified overlay and destination appliance. For example, if a source appliance in San Francisco is transmitting voice traffic to New York City, then an appropriate bonded tunnel is selected for that source-destination pair for voice traffic.

In step 1660, a primary and/or one or more secondary underlay tunnels are selected for transmission of the data from the source to the destination. For example, an identification may first be made as to which underlay tunnels go from a source appliance in San Francisco to a destination appliance in New York City. Then, the primary and secondary tunnels may be selected from that list of tunnels based on the bonding policy set by the network administrator for the overlay network, and the underlay network metrics and classification as discussed in reference to FIG. 4.

In step 1670, the packet header may be amended to direct the received packet over the selected tunnels and to an endpoint of a communication network. Amending the packet header may include encapsulating the packet with a new header. The communication network can be a wired, wireless, or virtual network.

While the method has been described in these discrete steps, various steps may occur in a different order, or concurrently. Further, this method may be practiced for each incoming packet, or the classification can be cached so other packets on the same flow are processed in the same manner.

High Availability Bonding Policy

Figure 9A:
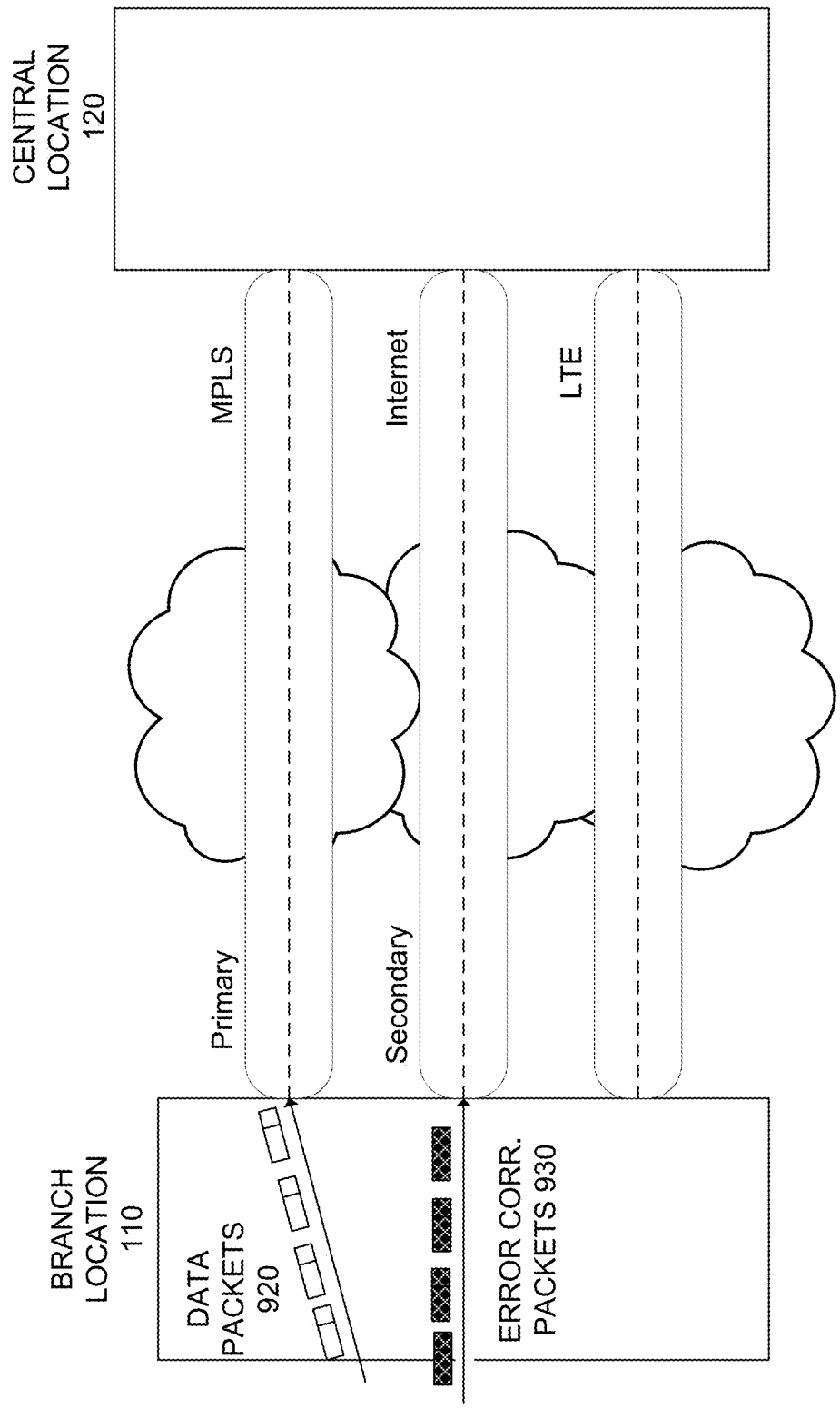

FIG. 9A depicts an exemplary embodiment of a system implementing a high availability bonding policy. In the exemplary embodiment, a branch location 110 has data to be transmitted across one or more communication networks to another entity, such as a data center, a second branch location, a central location 120, or another peer appliance. The data can utilize one or more communication networks as it travels from a source on one side of the network(s) to a destination on the other side of the network(s). While there can be multiple communication networks, they will be referred to herein as simply a singular 'network' for ease of reference.

There may be many types of network access links available to the appliance to transfer the data across the network, for example there may be an MPLS link, an Internet link, and a LTE link. The system may continually measure metrics across one or more of the links to determine the best access link to use for transferring data across the network, in view of the Quality of Service and business intent of an administrator. The metrics provide information regarding the transfer of data from each appliance to all other connected appliances in the network.

Furthermore, each access link may also have one or more tunnels for transferring data. The system may continually measure metrics across one or more of the tunnels to determine the tunnel(s) to use for transferring data across the network, in view of the Quality of Service and business intent of the data.

In an exemplary embodiment, the branch location may determine that the MPLS link has a latency of 50 milliseconds (ms) and a loss rate of 0.1%, while the Internet link has a latency of 100 ms and a loss rate of 0.3%. With these metrics, the system determines that the MPLS link represents the best access link to use since the path accessed via that access link has the better performance, and it is selected as the primary access link. The Internet link is selected as the secondary access link for data transfer. Data may travel over the primary link only, or over both the primary and secondary links.

In a high availability bonding policy scenario, an appliance may send data packets 920 across the primary access link, and an equal number of error correction packets 930 across the secondary access link. In the exemplary embodiment depicted in the figure, four data packets are shown as being transmitted across the primary access link and four error correction packets are depicted as being transmitted across the secondary access link. In this way, if any loss of data occurs in the network, as long as four total packets reach the recipient data center (either data packets or error correction packets or any combination thereof), the data can be reconstructed at the recipient and no total loss of data occurs. In this manner, the failover time is typically zero, since an equal number of error correction packets ensures that even if all data across the primary access link is lost, the information is still received by the recipient through reconstruction of the data from the error correction packets received over the secondary access link. Thus, no packets are dropped in the event of a failure, making the failover time effectively zero.

Further, in this high availability bonding policy, any number of a set of techniques, called path conditioning, can be applied to the data traveling over the tunnels. For example path conditioning may comprise error correction, order correction, fragmentation/coalescing, etc. Because the amount of error correcting information is approximately equal to the amount of data being sent, the bandwidth efficiency of a bonded tunnel while operating in this bonding policy is fifty percent. Different bonded tunnels can use different bonding policies at the same time. Error correction is described in further detail in U.S. Pat. No. 8,442,052 issued May 14, 2013 entitled "Forward Packet Recovery", which is incorporated herein by reference.

Figure 9B:
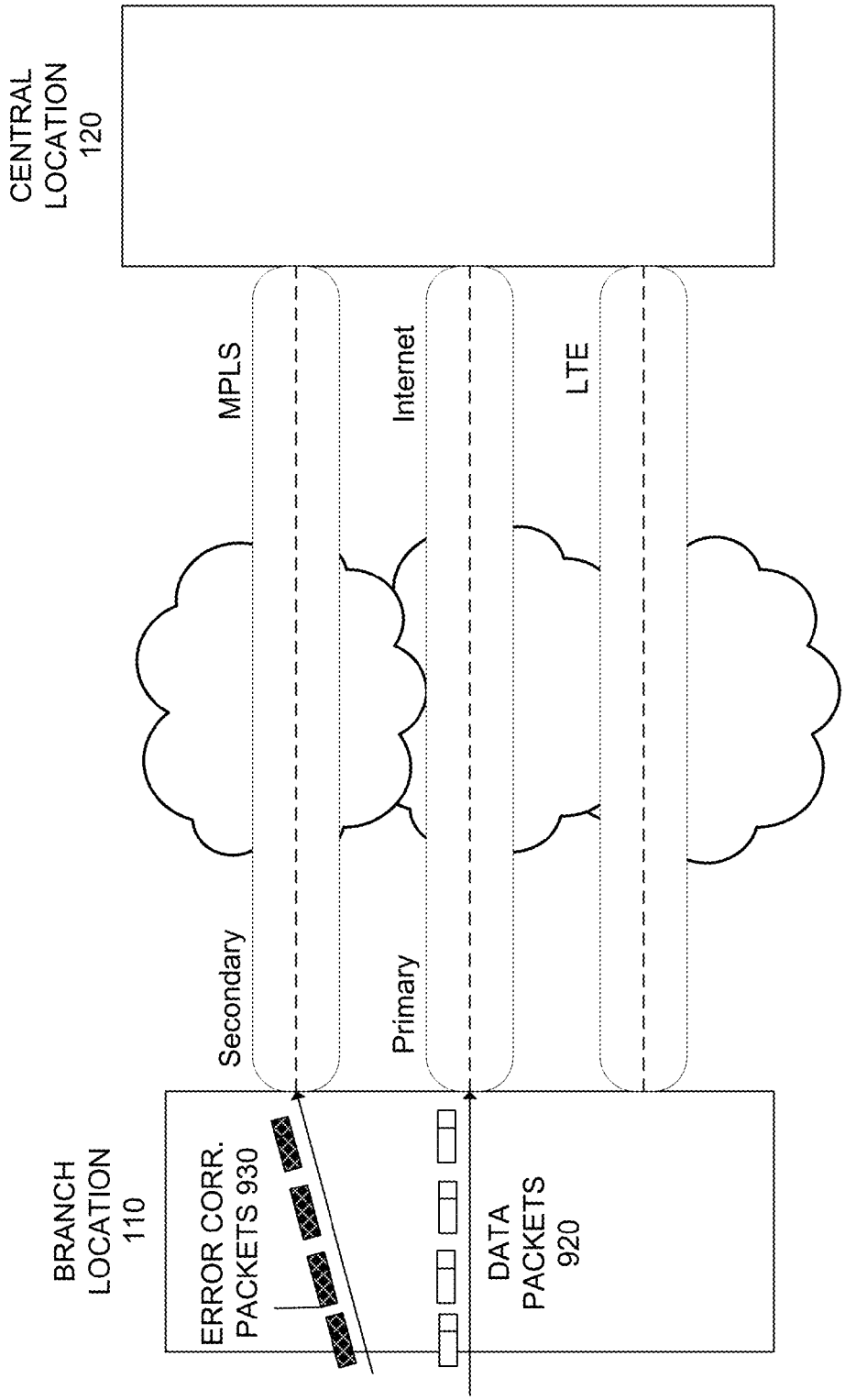

While transmitting data, the system also continually monitors the network health metrics across the various access links, provider links and tunnels. In an exemplary embodiment, it may be determined that the latency of the MPLS access link has increased to 150 ms and the loss rate has increased to 0.5%. Meanwhile, the Internet access link metrics remain the same at 100 ms latency and 0.3% loss. Thus, the Internet link has now become the better access link for data transmission, and may automatically be re-designated as the primary access link while the MPLS link is re-designated as the secondary access link, as depicted in FIG. 9B. Therefore, data packets 920 are now transmitted from the branch location 110 over the Internet access link and error correction packets 930 are transmitted over the MPLS access link. In other embodiments, the error correction packets and data packets can be mixed together on both access links.

In this way, the system may continually monitor the network health metrics and transmit data over the best quality access link as a primary access link, regardless of whether that primary link is MPLS, Internet, or some other type of network, thus allowing for dynamic switching of access links for data transmission.

High Quality Bonding Policy

FIG. 10 depicts an exemplary embodiment of a system implementing a high quality bonding policy. In this exemplary embodiment, the system may operate substantially similar to the high availability scenario by continually monitoring the network health metrics and transmitting data over the best quality access link, allowing for dynamic switching of access links for data transmission. Data packets 1020 are transmitted over the primary access link and error correction packets 1030 are transmitted over the secondary access link.

Path conditioning may also be used, but with fewer error correction packets. For example, the system may implement a rule that a maximum 1:5 ratio be adhered to for error correction packets to data packets; that is, there is up to 1 error correction packet for every 5 data packets transmitted. The number of error correction packets 1030 generated and transmitted can be based on the amount of loss measured on that particular access link. In some embodiments, no error correction packets are transmitted across the secondary access link. For example, if no loss is observed for a set period of time, then no error correction packets may be sent until loss is observed again. If a maximum ratio of 1:5 error correction packets to data packets is used, then the bandwidth efficiency of the network is >80%. However, other ratios of error correction packets to data packets may also be used in other embodiments.

If the primary access link becomes inoperable for any reason and data switches over to the secondary access link, some packets will be lost. Since the amount of error correction information is less than the amount of data, there can be some loss of data while transmission switches from the primary access link to the secondary access link. Typically, the transmission can switch from the primary access link to the secondary access link in less than 1 second, minimizing the amount of data loss. In contrast, failover times for existing networks are typically measured in minutes.

In this way, the system may continually monitor the network health metrics and transmit data over the best quality access link as a primary link, with a minimal amount of data packet loss in the event the primary access link fails and traffic is switched to the secondary access link.

High Throughput Bonding Policy

Figure 11:
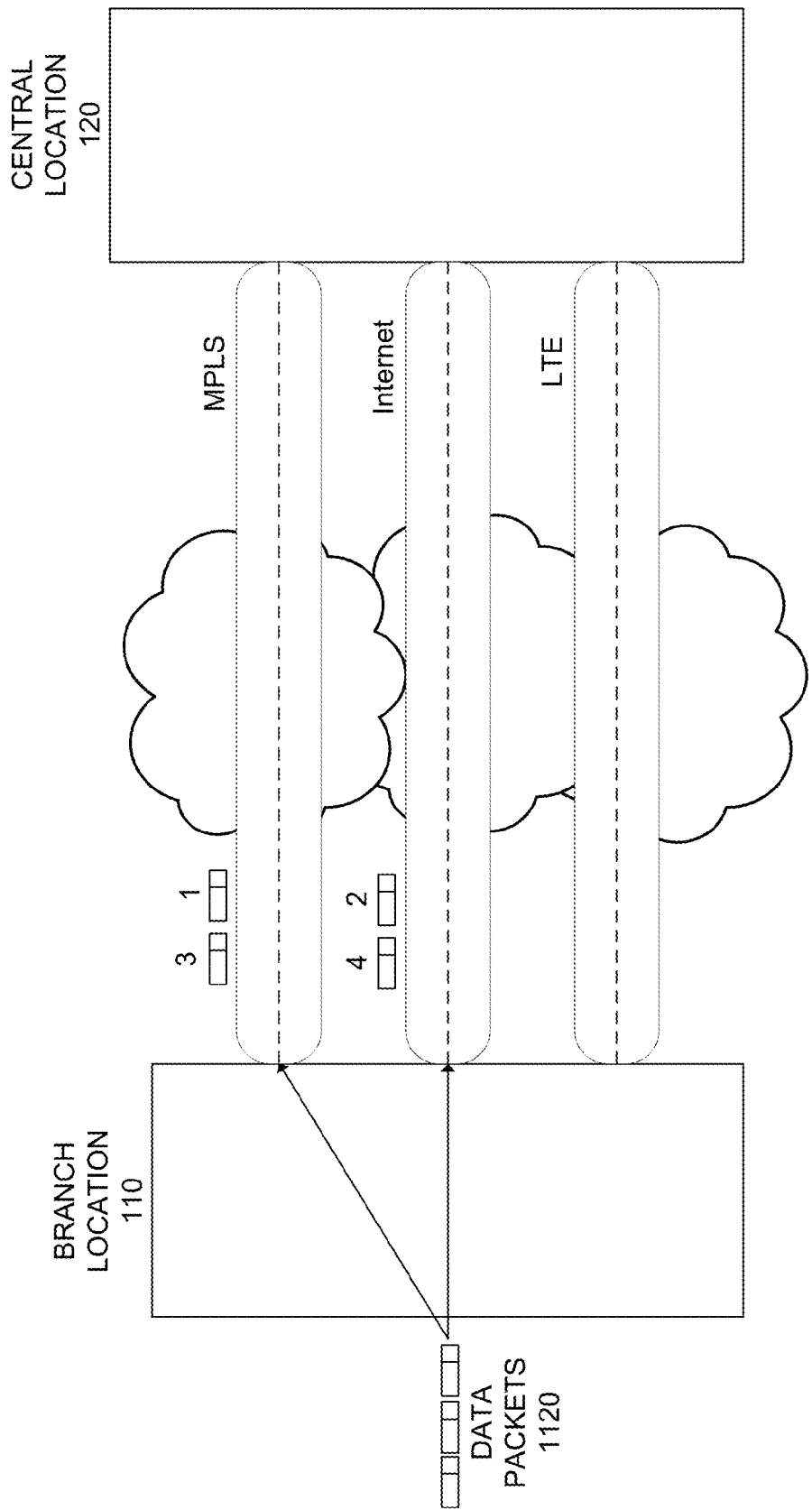

FIG. 11 depicts an exemplary embodiment of an appliance implementing a high throughput bonding policy for transmitting data. In this exemplary embodiment, the appliance at branch location 110 receives data packets 1120 and transmits them over two communication networks in a load balanced manner, rather than selecting a primary access link and a secondary access link. For example, if both the MPLS and Internet access links are to be used for data transmission, the appliance may transmit the first packet of data packets 1120 over the MPLS access link, the second packet over the Internet access link, and continue alternating packets over the access links. While the exemplary embodiment depicted in the figure shows two access links being used, three or more access links may also be used to transmit data in other embodiments.

In addition to the traditional approaches for load balancing (such as round robin or other methods), the appliance can also transmit data over access links such that a similar amount of free space is maintained on each access link. For example, in the exemplary embodiment depicted in FIG. 12A, the MPLS access link has more free space available, as represented by reference number 1220, than the amount of free space available on the Internet link, as represented by reference number 1260. Since the MPLS link free space 1220 is greater than the Internet link free space 1260, a first data transmission may occur over the MPLS link, as represented by reference number 1210.

Figure 12A:
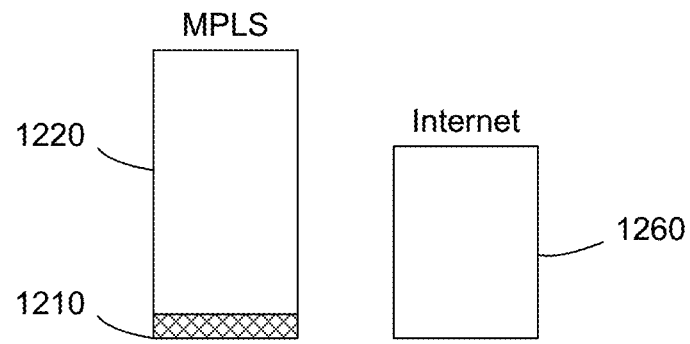
FIGS. 12A-12C depict an exemplary embodiment of load balancing links.
Figure 12B:
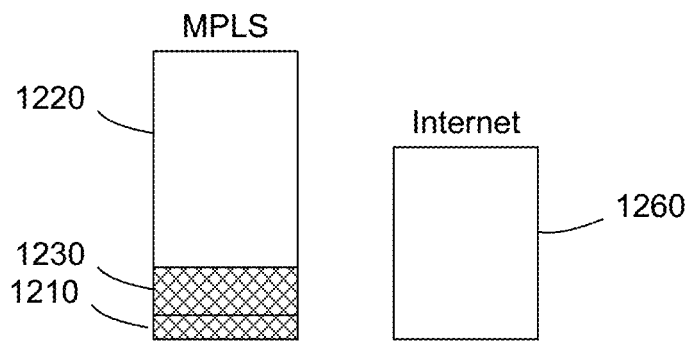
Figure 12C:
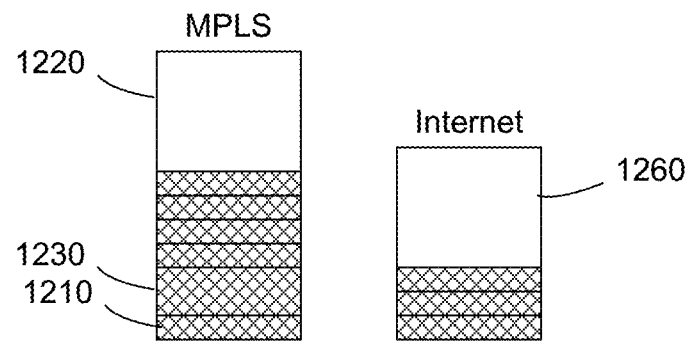

In the exemplary embodiment depicted in FIG. 12B, a second data transmission 1230 also occurs over the MPLS link because it still has more free space available than the Internet link. As data continues to be transmitted in this manner, eventually data will be transmitted over both the MPLS and Internet links, such that an equal amount of free space on each link can be maintained, as depicted in FIG. 12C by MPLS link free space 1220 and Internet link free space 1260.

As each packet is transmitted, a decision is made, on a packet by packet basis, as to which link to use, based on the amount of space available on each link. As understood by persons of ordinary skill in the art, there can be multiple ways of accomplishing this type of load balancing, where, a decision is made when each packet is transmitted, taking into account the space available. FIGS. 12A-12C merely depict one exemplary embodiment. Other embodiments, for example, may include tracking the amount of data recently scheduled on each of the links, or tracking the time when each link is ready to accept another packet.

As discussed herein, the high availability, high quality and high throughput bonding policies are only three examples of bonding policies. Other bonding policies can be used within the construct of the present disclosure. For example, error correction can be performed on the underlay tunnels instead of, or in addition to, on the overlay tunnels. Also, data packets and error correction packets can be sent over the same path.

Cross-Connect

Figure 13:
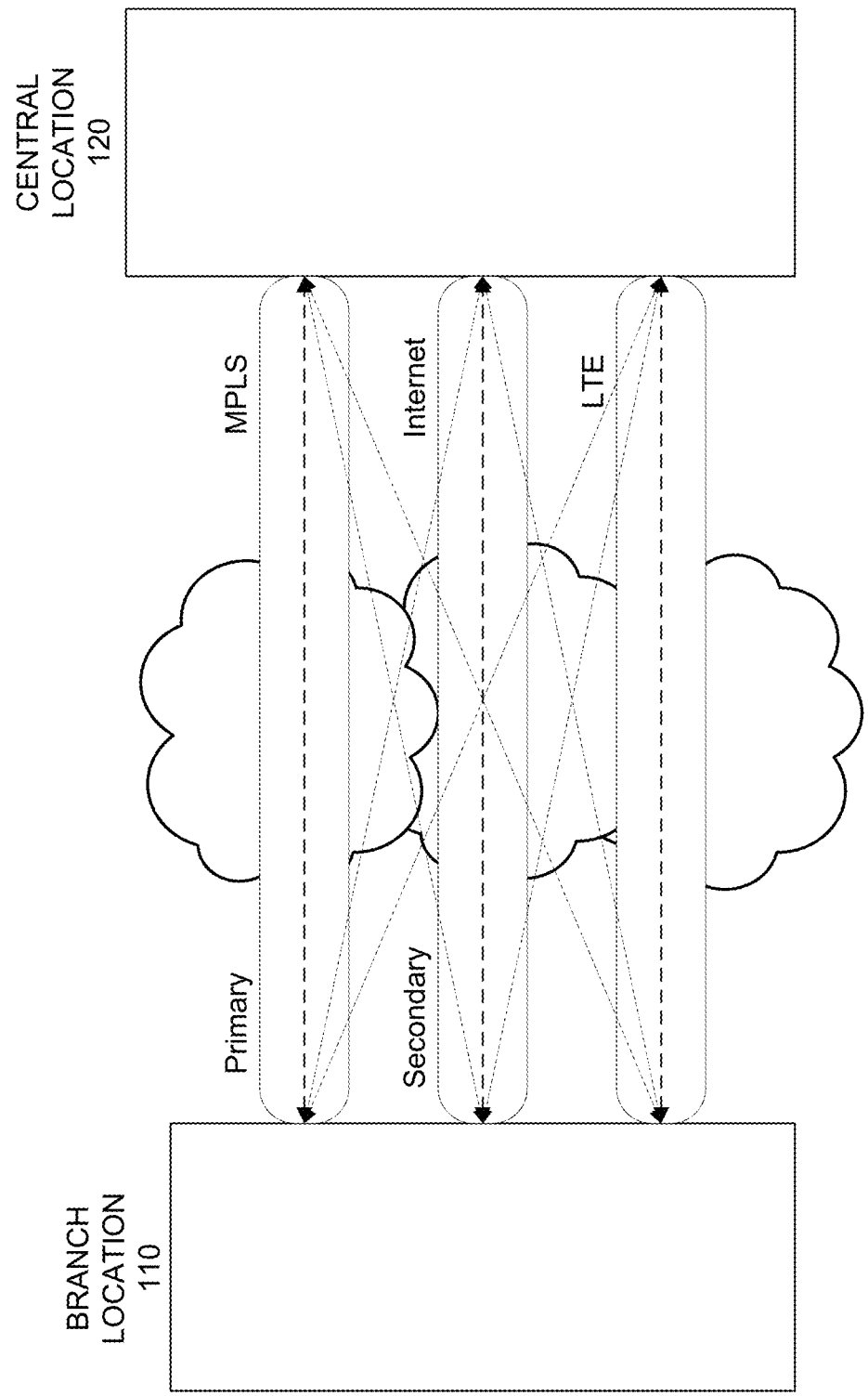
FIGS. 13, 14A and 14B depict exemplary embodiments of a system using multiple access link providers in a cross-connected manner.

FIG. 13 depicts an exemplary embodiment of a system using multiple access link providers in a cross-connected manner. Any bonding policy, including those discussed herein and not specifically mentioned here, can be implemented with access link providers cross-connected.

Typically, in transferring data over a network, the data is transmitted or delivered via the same type of link it arrives on, i.e., if data arrives on an MPLS link at an appliance, it is transmitted by the appliance to a further destination via the MPLS link. If the MPLS and Internet links are both inoperable, then the LTE link may be used. However, transferring data across an LTE network can be expensive, as this is a wireless network and the LTE network provider typically charges for each byte of data transmitted over the network. Furthermore, for large organizations having many locations and appliances, use of an IPsec tunnel across an LTE link means LTE data is used at both the source location and all of the destination locations that receive the data.

To address this issue, network providers can be cross-connected by tunnels that traverse access links, as depicted in the exemplary embodiment of FIG. 13. For example, a tunnel can be created for data transfer from an MPLS access link at a source site (such as branch location 110) to an Internet access link at a destination site (such as central location 120), or from an MPLS access link at a source site (such as branch location 110) to an LTE access link at a destination site (such as central location 120). In this way, data can be transmitted across tunnels in the most efficient and cost-effective manner, utilizing different access links at appliances at source and destination sites.

Network health metrics may be continuously measured over all of these tunnels such that the best tunnel for the overlay network can be selected for each type of traffic based on the business intent and network transmission objectives. Further, network metrics can be measured in each direction, instead of only by round trip time. Thus, data traveling from San Francisco to New York City may utilize one underlay tunnel, based on network performance metrics while data traveling from New York City to San Francisco may utilize a different underlay tunnel. The decision regarding which underlay tunnel(s) to use can be made independently at each appliance.

Figure 14A:
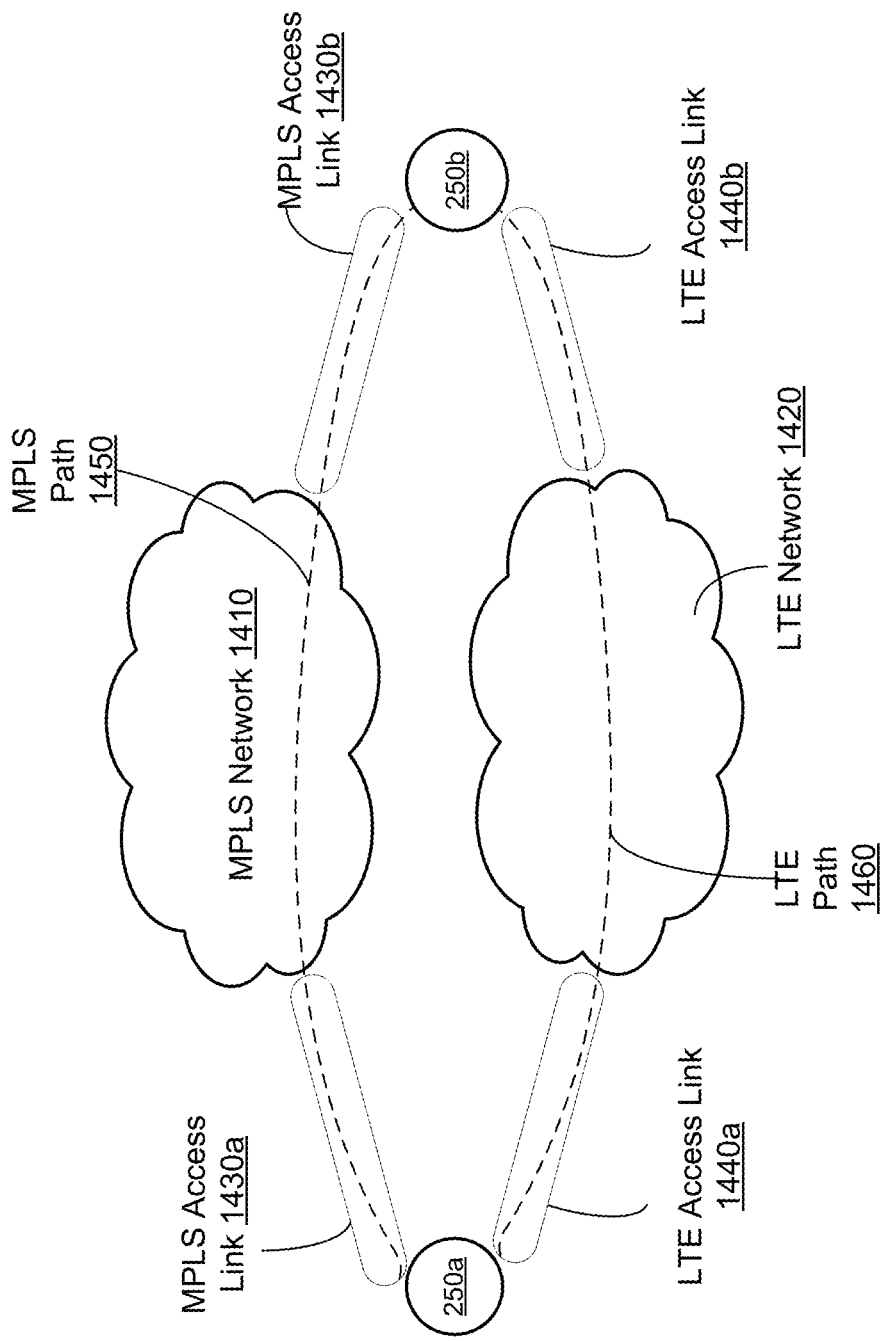

FIG. 14A depicts an exemplary network with two appliances 250a and 250b connected to each other via two communication networks: MPLS network 1410 and LTE network 1420. While two appliances are depicted in this exemplary embodiment, there may be any number of appliances connected to each other, in any configuration. Further, while an MPLS network and LTE network are depicted in this exemplary embodiment, there can be different or additional networks available to the networked appliances 250a and 250b.

In the exemplary embodiment of FIG. 14A, appliances 250a and 250b are connected to the MPLS network 1410 via MPLS access links 1430a and 1430b. Similarly, appliances 250a and 250b are connected to the LTE network 1420 via LTE access links 1440a and 1440b. In an active backup scenario, each data packet normally utilizes only one network, as represented by MPLS path 1450 for the MPLS network 1410 and LTE path 1460 for the LTE network 1420.

If a network access link goes down at one appliance, then a backup network access link may be used. For example, in an exemplary embodiment depicted in FIG. 14B, MPLS access link 1430a goes down at appliance 250a. Thus, at appliance 250a, the only operational network access link is LTE access link 1440a, and thus the LTE network 1420 is the only communication network through which appliance 250a can send or receive data. However, LTE network 1420 is a wireless LTE network, and is costly to use as the LTE service provider typically charges for every megabyte of data sent over the network. In conventional systems, since appliance 250a can only send data via the LTE access link, all other connected appliances will receive the data via the LTE network. That is, other appliances also must use the LTE network to receive the data from appliance 250a.

Figure 14B:
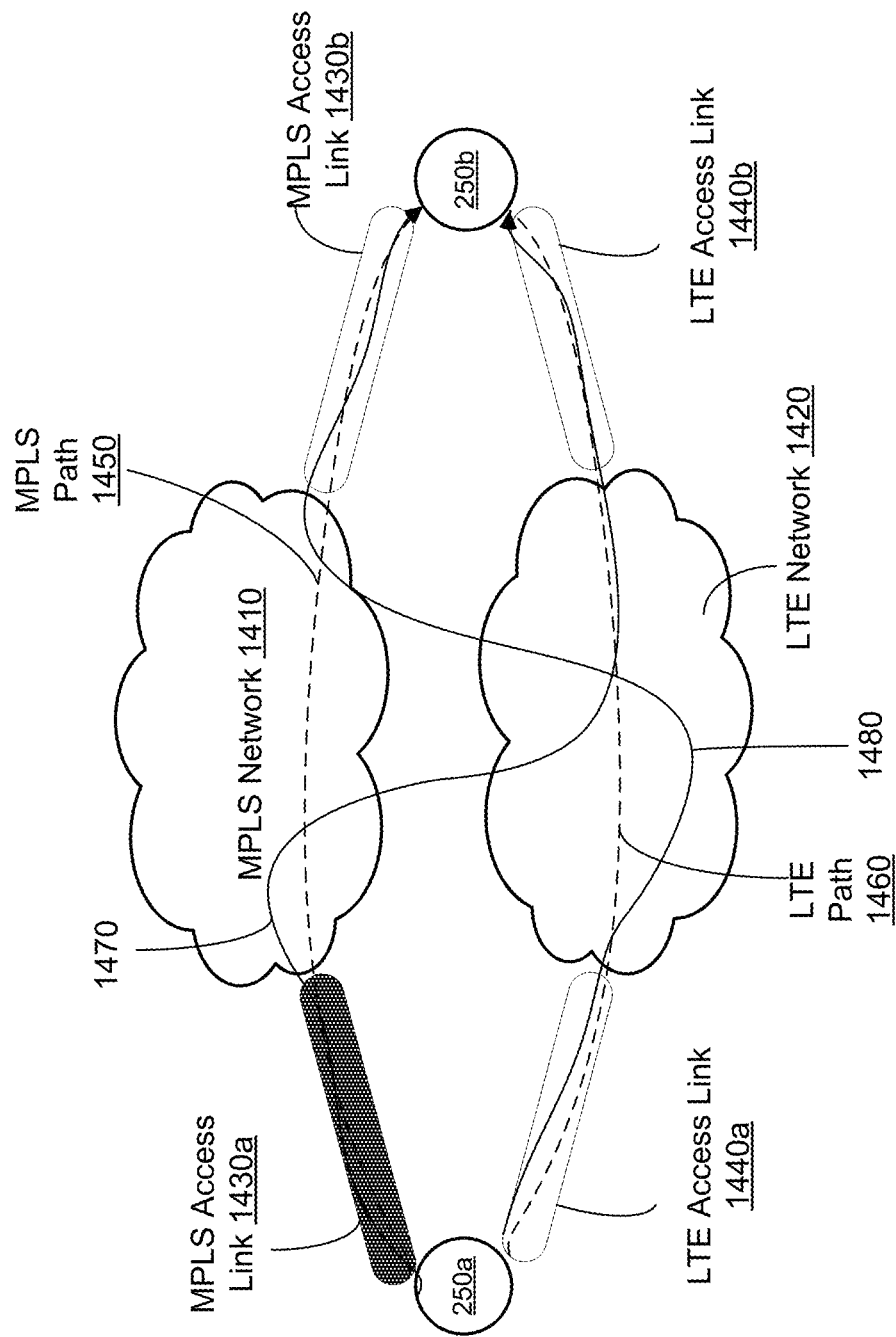

However, the other appliances at other sites, such as appliance 250b in FIG. 14B have operational MPLS links and thus incur charges unnecessarily by receiving data through the LTE access link. In this scenario, service providers may be cross-connected, as depicted in FIG. 14B. By using tunnels that cross-connect different service providers, data sent from the LTE access link from appliance 250a can utilize part of the LTE network 1420, and then switch over to the MPLS network 1410 while in transit, thus arriving at appliance 250b via the MPLS access link 1430b. This is represented by path 1480 in FIG. 14B.

Similarly, if MPLS access link 1430b goes down at appliance 250b but MPLS access link 1430a is operational at appliance 250a, then data transmitted by appliance 250a via MPLS access link 1430a can utilize part of the MPLS network 1410, then switch over to the LTE network 1420 in transit, arriving at appliance 250b via LTE access link 1440b, as shown by path 1470 in FIG. 14B. Thus, as long as at least one network access link is operational at an appliance, the appliance can send and receive data. Furthermore, if one appliance needs to use the wireless LTE network 1420 to send or receive data, all other appliances in the network do not automatically have to use wireless LTE to communicate with that appliance, thus preventing unnecessary charges from being incurred due to wireless LTE usage.

As a person of ordinary skill in the art would understand, even though the exemplary embodiment of FIG. 14B depicts MPLS and LTE networks, any two or more network service providers can be cross-connected in this manner such that data transmitted from an appliance via one network's access link can be received at another appliance via an access link to the same or different network. Data transmitted from appliance 250a can simply be sent from the LTE interface at appliance 250a but directed to the MPLS interface at appliance 250b. In this way, the data travels partly over one provider's network and then switches to another provider's network to reach the destination IP address.

IV. Visualization of Network Characteristics

Related U.S. patent application Ser. No. 14/981,814 filed Dec. 28, 2015 and entitled "Dynamic Monitoring and Visualization for Network Health Characteristics", of which the present application is a continuation-in-part, describes a visualization mechanism for displaying and categorizing network health characteristics. Such visualization dashboards and mechanisms can also be used for displaying and categorizing the network health characteristics described herein, to aid a user in determining which path, tunnel, link or mechanism to use for transferring each particular type of data based on the business intent of the user.

Using the visualization system, tunnel metrics can be measured, monitored, and displayed for the underlay tunnels, which are essentially measuring network performance. Further, tunnels metrics can be measured, monitored, and displayed for the overlay tunnels (or bonded tunnels), which are application-oriented metrics that a user can observe.

A bad network may be used to transmit data, but the user may still see good performance because of bonding. For example, use of the visualization system may show that a particular underlay tunnel is losing a lot of data, and thus it is characterized as a bad tunnel and displayed as "red" in the visualization chart. However, if a user has selected a high availability bonding policy and the error correction packets from the secondary link are enabling all of the data to reach the destination, then from the user's perspective, the transmission is operating as it should. Thus, even though the user of the network service may not realize that there is any problem with the network, the network provider can still detect that a problem exists with a network link. In this way, the visualization platform can be used to discern problems that exist in a network, even though a user may not notice any disruption in the transmission and receipt of data across the network. Further, the metrics can present performance/troubleshooting data from both a user or application point of view, and a network point of view.

Thus, methods and systems for virtual overlay networks are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for transmitting data via a virtual overlay network, comprising:
   receiving, at a first network appliance, data to be transmitted across a communication network to a destination, the data comprising a plurality of data packets;
   classifying the data based on a traffic access policy;
   assigning an overlay identification to the data denoting which overlay network the data is designated to utilize based on the classification, the overlay identification defining a traffic type;
   determining, based on the destination, a second network appliance to receive the data;
   selecting a bonded tunnel for the assigned overlay identification and the second network appliance, the bonded tunnel being a tunnel between the first network appliance and the second network appliance that is specific to the overlay network and incorporates two or more network paths;
   selecting one or more underlay tunnels to transfer the data, the one or more underlay tunnels selected based on network metrics;
   amending a header on each of the plurality of data packets, the header comprising (1) a bonded tunnel header for the selected bonded tunnel having the assigned overlay identification, and (2) an underlay tunnel header for the selected one or more underlay tunnels; and transferring the plurality of data packets from the first network appliance via the selected bonded tunnel and the selected one or more underlay tunnels to an endpoint of the communication network, for transmission by the communication network to the second network appliance.

2. The method of claim 1, wherein the traffic access policy is based on a label applied to data from each network interface of the first network appliance.

3. The method of claim 2, wherein the label is determined by a network administrator of the first network appliance.

4. The method of claim 1, wherein the traffic access policy is based on an access control list.

5. The method of claim 1, wherein the bonded tunnel utilizes two underlay communication networks, each communication network managed by a service provider.

6. The method of claim 1, further comprising applying a business intent to the data based on the overlay identification.

7. The method of claim 1, wherein the communication network is at least one of: Internet, MPLS, or LTE wireless connection.

8. The method of claim 1, wherein the overlay identification is at least one of: voice, video, or data.

9. The method of claim 1, wherein the first network appliance or the second network appliance is in a cloud network.

10. The method of claim 1, wherein the network metrics comprise at least one of re-ordering, loss, latency, and jitter.

11. The method of claim 1, wherein the bonded tunnel utilizes at least one underlay tunnel.

12. The method of claim 1, wherein the network metrics are displayed to a network administrator in a grid format.

13. The method of claim 1, wherein the plurality of data packets are transferred in accordance with a selected bonding policy.

\* \* \* \* \*